US006646590B2

(12) United States Patent
Terashima et al.

(10) Patent No.: US 6,646,590 B2

(45) Date of Patent: Nov. 11, 2003

(54) ROAD ANTENNA APPARATUS WITH SPEED DETERMINING MEANS

(75) Inventors: Masaki Terashima, Tokyo (JP); Yoshiteru Hirano, Tokyo (JP); Makoto Takemoto, Kanagawa (JP); Akihiro Inui, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/083,220

(22) Filed: Feb. 26, 2002

(65) Prior Publication Data

US 2002/0101371 A1 Aug. 1, 2002

Related U.S. Application Data

(62) Division of application No. 09/603,248, filed on Jun. 26, 2000.

(30) Foreign Application Priority Data

| | | |
|---|---|---|
| Jun. 29, 1999 | (JP) | 11-184170 |
| Jul. 6, 1999 | (JP) | 11-191818 |
| Jul. 6, 1999 | (JP) | 11-191837 |
| Jul. 15, 1999 | (JP) | 11-201732 |
| Jul. 15, 1999 | (JP) | 11-202226 |
| Aug. 26, 1999 | (JP) | 11-240217 |

(51) Int. Cl.[7] ................................................ G01S 13/58

(52) U.S. Cl. ........................................ 342/104; 340/905

(58) Field of Search ................................ 340/905, 936, 340/539.1; 342/104, 114; 701/117, 119

(56) References Cited

U.S. PATENT DOCUMENTS

| | | | | | |
|---|---|---|---|---|---|
| 4,591,823 | A | * | 5/1986 | Horvat | 340/466 |
| 4,866,438 | A | * | 9/1989 | Knisch | 340/936 |
| 5,381,155 | A | * | 1/1995 | Gerber | 340/936 |
| 5,987,374 | A | * | 11/1999 | Akutsu et al. | 701/119 |
| 6,163,277 | A | * | 12/2000 | Gehlot | 340/539 |
| 6,466,862 | B1 | * | 10/2002 | DeKock et al. | 701/119 |

FOREIGN PATENT DOCUMENTS

| | | |
|---|---|---|
| JP | 10-163745 | 6/1998 |
| JP | 10-214359 | 8/1998 |
| JP | 10-261120 | 9/1998 |

* cited by examiner

*Primary Examiner*—Ian J. Lobo

(74) *Attorney, Agent, or Firm*—Pearne & Gordon LLP

(57) ABSTRACT

A road antenna apparatus includes a road antenna 104 which is mounted on a post 103 and at an elevated position on a road R and via a radio wave establishes radio communication with an on-vehicle radio device 102 mounted in a vehicle 101 which is traveling over the road; and a determining device provided in the antenna and determining whether the travel speed of the vehicle is appropriate for a speed limit imposed on a road, on the basis of the travel speed of the vehicle based on a signal corresponding to a reflected wave, the reflected wave being produced as a result of the radio wave emitted from the antenna being reflected by the vehicle.

6 Claims, 25 Drawing Sheets

ROAD ANTENNA APPARATUS WITH SPEED DETERMINING MEANS

The present application is a division of application Ser. No. 09/603,248 filed on Jun. 26, 2000.

BACKGROUND OF THE INVENTION

The present invention relates to a road antenna for use with an electric toll collection (ETC) system, which system can automatically collect a toll through radio communication without involvement of temporary stopping of a traveling vehicle which is passing through a tollgate of a turnpike.

The present invention also relates to a transmitter, a receiver, a radio system, and a method of setting a communications area, all of which are applied to narrow-band communication, such as that realized by a turnpike electric toll collection system (hereinafter referred to simply as an "ETC system"), and which controls an output of radio transmission established between a cell station and a mobile station.

Further, the present invention relates to a travel-speed support system which determines whether or not a vehicle is traveling in excess of a speed limit for vehicles set on a turnpike or an ordinary road and sends a notice to the driver of the vehicle when the vehicle is traveling in excess of the speed limit, as well as to an antenna for use with the system.

A traveling vehicle has conventionally been required to temporarily stop at a tollgate of a turnpike and receive a highway ticket from or pay a toll to an official, thus greatly contributing to a traffic jam. Against such a backdrop, attempts have been made to put an electronic toll collection system (ETC) into actual use as a nonstop tollgate system which eliminates a necessity for temporarily stopping a vehicle.

FIG. 27 shows an example ETC system scheduled to be put into practical use. In this drawing, a vehicle 1 is equipped with an on-vehicle radio device 2. A road antenna 4 is mounted on a post 3 and at a position above a road R. Radio communication is established between the on-vehicle radio device 2 and the road antenna 4. A vehicle sensor 5 is disposed on either side of the road R for optically detecting passage of the vehicle 1.

The antenna 4 establishes radio communication with on-vehicle radio device 2 mounted in a vehicle 1 which is passing through the post 3, to thereby specify the owner of the vehicle 1 through use of the radio device 2. For example, ID information to be used for specifying the owner of the vehicle 1 is written in the on-vehicle radio device 2.

A toll and information for specifying the owner of the vehicle 1 are written into a storage area of the antenna 4 every time the vehicle 1 passes through the post 3. The toll and the vehicle owner ID information, which have been acquired while the vehicle 1 passes through the post 3, are transmitted to an unillustrated center by way of the antenna 4. The unillustrated center summarizes tolls and on a monthly basis collects the tolls from the owner of the vehicle 1 that has passed through the post 3.

In this system, after a vehicle detector 5 disposed on the road of a turnpike has detected passage of the vehicle 1, radio communication pertaining to a toll is established between the antenna 4 and the on-vehicle radio device 2. Accordingly, collection of tolls is performed smoothly without involvement of temporary stopping of a traveling vehicle.

In terms of design of the ETC system, there is specified a coverage area of radio communication established between the on-vehicle radio device 2 and the road antenna 4. FIG. 28 is a plan view showing an example coverage area. A hatched communications area F1 is a range within which radio communication can be established between the on-vehicle radio device 2 and the road antenna 4. The remaining area; i.e., a non-response area F2, is a range in which radio communication is not permitted.

An electric field level of the road antenna 4 chiefly determines whether or not radio communication is feasible. In a case where the electric field of the road antenna 4 is greater than a predetermined level, the on-vehicle radio device 2 can perform a receiving operation, thus enabling radio communication. In contrast, in a case where the electric field of the road antenna 4 is less than a predetermined non-response level, the on-vehicle radio device 2 cannot perform a receiving operation. Accordingly, the area where the on-vehicle radio device 2 cannot establish radio communication is taken as a non-response area.

In the previously-described case, the road antenna 4 has a sharp directional pattern, and an angle at which the road antenna 4 is mounted on the post 3 greatly affects the distribution of electric field. FIG. 29 shows an example road antenna 4 mounted on the post 3. FIG. 30 shows an example distribution of receiving electric field at a position 1 meter elevated from the road R and with respect to the direction in which the vehicle travels.

As shown in FIG. 30, an electric field level L1 designates a communicable threshold level, and an electric field level L2 designates a non-response threshold level. From FIG. 30, it is understood that the communications area F1 and the non-response area F2, which are shown in FIG. 28, are embodied by reference to these threshold levels.

FIG. 31 shows an example distribution of an electric field produced in a case where only an angle $\theta$ at which the road antenna 4 is mounted and is shown in FIG. 29 is changed. In this case, the predetermined communications area F1 shown in FIG. 28 is not ensured, and receiving power—which is greater than the communicable threshold value level L1 and at which the on-vehicle radio device 2 can perform a receiving operation—exists in the non-response area F2. There is a possibility of the ETC system yielding a failure.

For example, as shown in FIG. 32, in a case where a vehicle 1A having no on-vehicle radio device and a vehicle 1B having an on-vehicle radio device passe through the ETC system while the vehicle 1B is following close behind the vehicle 1A, the vehicle sensors 5 detect the vehicle 1A. However, radio communication is established between the road antenna 4 and the on-vehicle radio device 2 of the vehicle 1B. As a result, the ETC system yields a failure, thereby permitting passage of the vehicle 1A without charge.

In order to prevent a failure, means for ascertaining in advance an angle $\theta$ at which the road antenna 4 is mounted (hereinafter referred to simply as a "mount angle") becomes necessary. At the time of installation of the road antenna 4, the post 3 standing at a height of 5 m or more is fixed through use of a bucket vehicle or a like vehicle. After installation of the road antenna 4, the mount angle $\theta$ of the road antenna 4 cannot be readily ascertained. However, it is thought that after installation the mount angle $\theta$ of the road antenna 4 may be changed by a blow or an earthquake.

FIG. 33 is a plan view showing an example coverage area. As shown in FIG. 33, in terms of design of the ETC system, there is specified a coverage area of radio communication established between the on-vehicle radio device 2 and the road antenna 4. A communications area F1 is a range within which radio communication can be established between the on-vehicle radio device 2 and the road antenna 4. The remaining area is a range in which radio communication is not permitted.

In the previous ETC system, the communications area F1 must be covered by means of the directivity of the road antenna 4. However, the transmission power of the road antenna 4 is changed for reasons of environmental or secular changes, the range of the communications area F1 is also changed, thereby resulting in a system failure. Further, depending on variation in the angle at which the road antenna 4 is mounted, the communications area F1 is greatly changed, thereby interfering with radio communication established by a vehicle which is traveling on an adjacent lane.

FIG. 34 shows a commonly-employed transmission circuit 50. In FIG. 34, reference numeral 51 designates a radio section; 52 designates a level control attenuator; and 53 designates an antenna.

The transmission circuit 50 is applied to, for example, an ETC system. According to this system, a narrow-band communications area is formed in the space between radio devices disposed on either road of a turnpike. Radio communication is established between a traveling vehicle and the road radio devices through use of a radio wave of predetermined frequency (for example, a frequency band of 5.8 GHz), to thereby collect a toll for using the turnpike.

FIG. 35 shows an antenna disposed at a tollgate of an ETC system. In FIG. 35, reference numeral 61 designates a road antenna; 62 designates an island; 63 designates a lane; and 64 designates a communications area. For example, a vehicle which is traveling in, for example, a lane 63*a*, establishes communication with a road antenna 61*a* within only a communications area 64*a*.

In terms of prevention of a chance of interference arising in an radio wave used in an adjacent lane, or prevention of erroneous communication with another vehicle running before or after the vehicle of interest in the same lane, the range of communications area 64 preferably remains constant. For this reason, a transmission e.i.r.p value output from the antenna 53 shown in FIG. 34 must be set to a predetermined level.

However, variations are present in constituent elements of the transmission circuit 50; that is, the transmission output of the radio section 51 or the antenna gain of the antenna 53. In order to obviate these variations, individual constituent elements must be adjusted through use of the level control attenuator 52.

The road antenna has a directional pattern such as that shown in FIG. 36, and a communications area of the road antenna differs according to an angle at which the antenna is mounted. Consequently, the angle must be adjusted in order to ensure a desired communications area. Measurement of receiving field intensity at each angle requires a great deal of manpower.

Moreover, the ETC system must ensure highly-reliable communication. To this end, a communication area in which radio communication is to be established and a non-response area in which no radio communication is to be established must be embodied in compliance with specifications of system design. Therefore, such specifications are usually accomplished by imparting a sharp directional pattern to the road antenna.

However, the radio wave emitted from the road antenna or the on-vehicle device spreads not only to a lane of interest but also to the opposite lane, because of multiple reflections of a radio wave induced by vehicles or surrounding facilities. Therefore, radio communication is erroneously established with an oncoming vehicle to which a charge is not allowed to be charged, and a toll may be erroneously charged to an oncoming vehicle.

Further, the ETC system eliminates a necessity of temporarily stopping a vehicle at a tollgate. However, a traveling vehicle may pass through a tollgate at high speed or keep traveling at the same speed even after the vehicle has entered an ordinary road. Thus, a vehicle becomes apt to induce a traffic accident. In order to prevent a traffic accident, there is needed a travel-speed support system for measuring a travel speed of a vehicle which is traveling on a road adopting an ETC system, to thereby realize smooth travel.

In association with actual use of a turnpike ETC system, a necessity for temporarily stopping a vehicle at a tollgate is eliminated. As a result, it is predicted that a traveling vehicle passes through a tollgate at high speed or enters an ordinary road from a turnpike without being aware of a change in legal speed.

Moreover, in order to avoid establishment of radio communication with a vehicle which is traveling in an adjacent lane, the ETC system establishes radio communication at a frequency of 5.8 GHz within a narrow communications area F1 formed by the road antenna 4.

FIGS. 37A and 37B show the directional patterns of the road antenna. FIG. 37A shows a horizontal directional pattern of the road antenna 4, and FIG. 37B shows a vertical directional pattern of the road antenna 4. As is evident from these characteristic plots, the road antenna 4 shows horizontal and vertical directional patterns in which a communication area can be formed within a narrow range of −20 to +20 degrees relative to the center.

SUMMARY OF THE INVENTION

The present invention has been conceived to solve such a drawback of the background art and is aimed at providing a road antenna in which an angle at which the road antenna is mounted can be readily ascertained after the road antenna has been mounted on a post.

The present invention has been conceived to solve such a drawback of the background art and is aimed at providing a road antenna which can prevent occurrence of a change in a communications area by means of controlling the road antenna and prevent occurrence of a system failure or interference of radio communication established by a vehicle traveling on an adjacent lane.

The present invention has been conceived to solve such a drawback of the background art and is aimed at providing a transmitter, a receiver, a radio system, and a communications area setting method, all of which enable savings in labor required for measuring field intensity and ensure a desired communications area.

The present invention has been conceived to solve such a drawback of the background art and is aimed at providing a road antenna which prevents occurrence of erroneous communication with an oncoming vehicle traveling in the opposite lane.

The present invention is aimed at providing a travel-speed support system which sends to a vehicle which travels in excess of a speed limit a warning to reduce travel speed, to thereby prevent traveling of a vehicle at extralegal speeds and support smooth travel of a vehicle on a turnpike or an ordinary road.

The present invention has been conceived to solve the drawback of the background art and is aimed at providing a road antenna which can form a narrow communications area even when a structure is located at an elevated position above the road antenna.

According to first aspect of the invention, a road antenna comprises a road antenna which is mounted on a post and at an elevated position on a road and establishes radio communication with an on-vehicle radio device mounted in a vehicle which is traveling over the road; and a laser-beam emitting device which is mounted on the road antenna and radiates a laser beam onto a predetermined position on the surface of the road. An offset in the angle at which a road antenna is mounted can be readily ascertained on the basis of a distance between a predetermined position on the surface of the road and a position on the road surface onto which a laser beam is actually radiated.

Preferably, the road antenna according to the first aspect further comprises a laser-beam receiving device which is mounted on the predetermined location on the surface of the road and receives a laser beam emitted from the laser-beam emitting device, wherein the operation of the road antenna is stopped when the laser-beam receiving device cannot receive the laser beam. In a case where the laser-beam receiving device fails to receive a laser beam emitted from a laser-beam emitting device that has been disposed at a predetermined elevated position above the road at the time of installation of the road antenna, it becomes evident that a change has arisen in the angle at which the road antenna is mounted. Therefore, the operation of the road antenna is stopped in order to avoid an operation failure of an electric toll collection system.

According to a second aspect of the invention, a road antenna comprises:

a road antenna which is disposed at an elevated position above a road and establishes radio communication with an on-vehicle device mounted in a vehicle traveling on the road; a receiver which is disposed at a predetermined location on the surface of the road and within a communications area, receives a radio wave output from the road antenna, and outputs a signal proportional to the power of the radio wave; and a controller for determining transmission power of the road antenna on the basis of the signal output from the receiver, wherein the controller controls the road antenna so as to prevent the transmission power of the road antenna from exceeding a predetermined value. The receiver detects the transmission power of the road antenna, and a signal proportional to the thus-detected transmission power is fed back to the controller, to thereby adjust the transmission power of the road antenna so as to prevent occurrence of a change in the communications area.

Preferably, receivers are disposed at respective corners of the communications area formed on the road, and the controller determines, from signals output from the respective receivers, the angle at which the road antenna is mounted, to thereby detect an offset in the angle of the antenna with respect to a predetermined angle. The signals output from the respective receivers are fed back to the controller, and the controller detects, on the basis of these signals, the angle at which the road antenna is mounted, to thereby detect an offset from a preset initial angle of the road antenna.

According to third aspect of the invention, the present invention provides a method of setting a communications area, comprising the steps of: measuring a receiving rate for each of frames of a received signal when a receiver receives a radio wave transmitted from a transmitter; detecting change in receiving rate on a per-frame basis, the change being induced by a change in a transmission output of the radio wave transmitted from the transmitter; and setting, into the transmitter, a transmission output obtained when there is detected a receiving rate suitable for a desired communications area established between the transmitter and the receiver. The method ensures a desired communications area through simple procedures while avoiding manpower required for measuring field intensity.

According to the fourth aspect of the present invention, a radio system comprises: a transmission section including a modulation section for producing a modulation signal, gain controller for controlling a transmission output, a power amplification section for amplifying a transmission signal to a desired level, and an antenna; and a receiving section including an antenna, frequency converter for converting into an intermediate frequency a high-frequency signal received by way of the antenna, a demodulation section for demodulating the intermediate frequency, decoder for converging a demodulated signal into digital data, and receiving rate detector for detecting a receiving rate for each of frames of a received signal. On the basis of the receiving rate detected on a per-frame basis by the receiving rate detector of the receiving section, the gain controller of the transmission section varies a transmission output. As a result, a desired communications area can be set in a space between the transmission section and the receiving section. At this time, measurement of field intensity is not necessary.

The present invention according to the fifth aspect of the invention provides a transmitter comprises: a modulation section for producing a modulation signal; gain controller for controlling a transmission output; a power amplification section for amplifying a transmission signal to a desired level; and an antenna, wherein the gain controller varies the transmission output on the basis of a receiving rate for each frame determined when a receiver receives a transmission signal. On the basis of the receiving rate detected on a per-frame basis by the receiver, the transmission output of the transmitter can be set to a value at which a desired communications area can be realized.

Preferably, the gain controller comprises a data setting device and a voltage-controlled amplifier and can freely change a communication area by means of variation of an amplification gain. The communications area can be varied by means of changing the gain of the voltage-controlled amplifier.

Preferably, the gain controller comprises a data setting device and a voltage-controlled amplifier and can freely change a communication area by means of variation of an amplification gain. A communications area can be varied by means of varying the amount of attenuation of the voltage-controlled attenuator.

Preferably, the antenna has a function of adjusting the angle at which the antenna is disposed, by means of a signal output from the receiving rate detector, and can freely change a communications area by means of changing the angle. The angle at which the antenna is mounted is changed, to thereby enable changing of a communications area.

According to the sixth aspect of the invention, a receiver comprises: an antenna for receiving a radio wave transmitted from a transmitter; frequency converter for converting into an intermediate frequency a high-frequency signal received by way of the antenna; a demodulation section for demodulating the intermediate frequency; decoder for converting the demodulated signal into digital data; and receiving rate detector for detecting a receiving rate for each of frames of the received signal, wherein a communications area can be freely changed by means of changing a transmission output of the transmitter on the basis of the receiving rate for each frame detected by the receiving rate detector. On the basis of a receiving rate obtained on a per-frame basis, a transmission output of the transmitter can be set such that a desired receiving area is realized.

According to the seventh aspect of the invention, a road antenna comprises: a road antenna which is disposed at an elevated position above a road and establishes radio communication with an on-vehicle device mounted in a vehicle traveling on the road; Doppler signal processor which detects the traveling direction of the vehicle on the basis of a change arising in the frequency of a reflected wave due to the Doppler effect, the reflected wave being formed when a transmission wave emitted from the road antenna is reflected by the vehicle; and controller for inhibiting establishment of communication with a vehicle traveling in the lane opposite to the lane in which the detected vehicle is traveling. A transmission wave is transmitted from the road antenna disposed at an elevated position on the road, and the vehicle reflects the transmission wave, to thereby produce a reflected wave. The thus-reflected wave is received by the road antenna. From the reflected wave, Doppler signals which shift in proportion the speed of the vehicle are detected, and the traveling direction of the vehicle is detected by utilization of the Doppler effect. Thus, radio communication is established with only a vehicle traveling in a lane of interest, and establishment of communication with a vehicle traveling in the opposite lane is inhibited.

Preferably, the road antenna comprises reflected wave extraction means which receives the reflected wave produced when the transmission wave emitted from the road antenna for establishing radio communication and collecting a toll is reflected by the vehicle as well as a receipt wave emitted from the on-vehicle device mounted in the vehicle, to thereby extract only the reflected wave. By utilization of a reflected wave produced when a transmission wave emitted to the on-vehicle device for establishing radio communication and collecting a toll is reflected by the vehicle, the traveling direction of the traveling vehicle is detected by the Doppler effect, thereby inhibiting establishment of communication with the vehicle traveling in the opposite lane.

According to the eighth aspect of the invention, a travel-speed support system comprises: on-vehicle radio device to be mounted in a traveling vehicle; an antenna which establishes radio communication with the vehicle and is to be mounted in a position above a road; and determination means which is provided in the antenna and determines whether or not the travel speed of the vehicle is appropriate for a speed limit imposed on a road, on the basis of the travel speed of the vehicle and a signal corresponding to a reflected wave, the reflected wave being produced as a result of a radio emitted from the antenna being reflected by the vehicle when the vehicle approaches or departs from the antenna. A warning to reduce travel speed can be sent to a driver of a vehicle which is traveling in excess of a speed limit, to thereby limit the speed of a vehicle on a road interconnecting a turnpike to an ordinary road. As a result, the present invention can urge a driver to practice safe driving on a road interconnecting a turnpike and an ordinary road.

Preferably, the antenna comprises: receiver for receiving a reflected wave, the reflected wave being produced when a radio transmitted to the on-vehicle unit is reflected by the vehicle; and detector for detecting a signal received by the receiver and the speed of the vehicle. The travel speed of the vehicle can be limited on the basis of the received signal and the detected travel speed of the vehicle.

Preferably, the antenna comprises: speed warning means which compares the travel speed of the vehicle detected by the detector with a predetermined warning speed, determines whether or not the speed of the vehicle exceeds the warning speed, and issues a warning to the vehicle if the vehicle exceeds the warning speed. A warning message can be sent to the driver of a vehicle which is traveling in excess of a speed limit, on the basis of the received signal and the detected travel speed of the vehicle.

The present invention provides an antenna for use with a travel-speed support system, comprises on-vehicle radio device to be mounted in a traveling vehicle; an antenna which establishes radio communication with the on-vehicle radio device and is to be disposed at a position above a road; and measurement means for measuring the speed of the traveling vehicle on the basis of a signal corresponding to a reflected wave by means of the Doppler effect when the vehicle approaches or departs from the antenna, the reflected wave being produced when a radio wave is reflected by the vehicle, wherein the road includes both a turnpike and an ordinary road. A limit is imposed on a driver of a vehicle which is traveling in excess of a speed limit, to thereby prevent a car accident. Thus, the present invention can enable the driver to ascertain that his vehicle is traveling in excess of a speed limit and send a warning to the driver. As a result, a car traveling in excess of a speed limit imposed on a turnpike or an ordinary road can be prevented.

Preferably, the antenna comprises: receiver for receiving a wave which is reflected by the vehicle, as a result of a radio wave being transmitted to the on-vehicle radio device; and detector for detecting the signal received by the receiver and the speed of the vehicle. A limit can be imposed on the speed of a vehicle on the basis of a received signal and the detected speed of the vehicle.

Preferably, the antenna comprises: speed warning means which compares the travel speed of the vehicle as detected by the detecter with a predetermined warning speed, determines whether or not the speed of the vehicle exceeds the warning speed, and issues a warning to the vehicle if the vehicle exceeds the warning speed. A warning can be sent to a driver of a vehicle which is traveling in excess of a speed limit, on the basis of a received signal and the detected speed of the vehicle, to thereby cause the driver to ascertain that his vehicle is traveling in excess of a speed limit.

According to the ninth aspect of the invention, a road antenna comprises: a road antenna which is disposed at an elevated position on a road and sets a predetermined communications area on the road; and a roof-shaped structure which is located at an elevated position above the road antenna, the side of the structure opposite the road antenna being provided with a radio-wave absorbing material, wherein radio communication is established between the road antenna and an on-vehicle device mounted in a vehicle traveling on the road and within the communications area. Preferably, as the radio-absorbing member there may be used a sheet-like radio-wave absorbing member, a paint-like radio-wave absorbing member, or a multilayer radio-absorbing member.

A radio wave emitted from the road antenna is reflected by a road, and the thus-reflected radio wave is absorbed by the radio-wave absorbing member provided on the roof-shaped structure. As a result, there is formed a narrow communications area, which would also be formed when no structure is present above the road antenna.

BRIEF DESCRIPTION OF THE DRAWINGS

FIGS. 37A and 37B show an example directional pattern of the road antenna, wherein FIG. 37A is a graph showing a horizontal directional pattern, and FIG. 37B is a graph showing a vertical directional pattern.

DETAILED DESCRIPTION OF THE PREFERRED EMBODIMENTS

Preferred embodiments will now be described with reference to the drawings.

Embodiment 1

Figure 1:
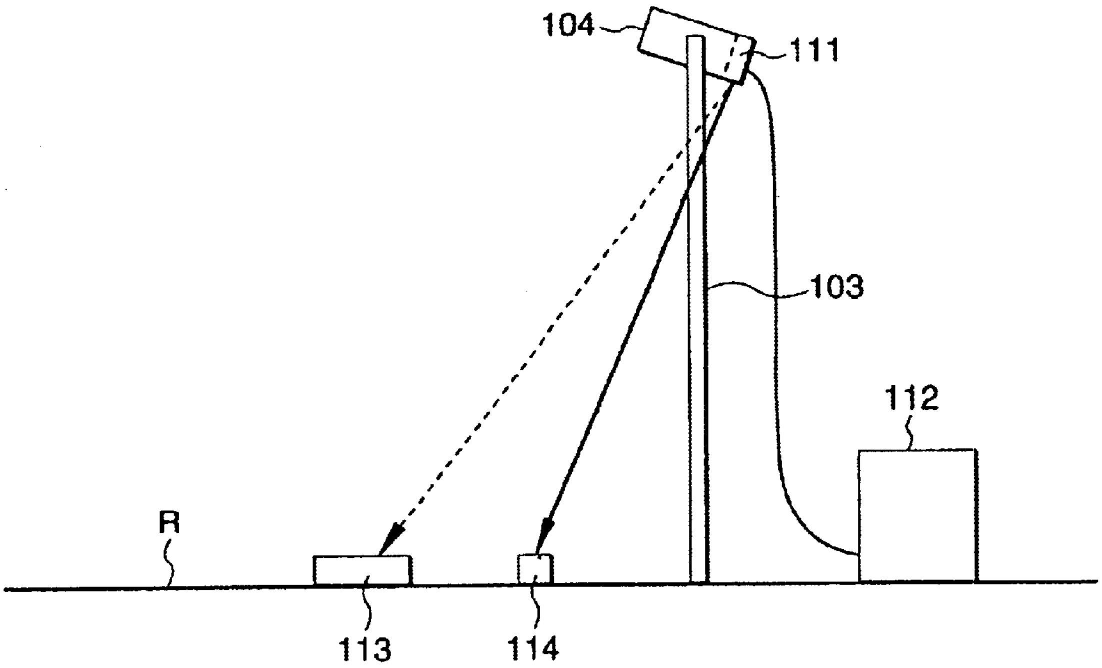
FIG. 1 is an illustration schematically showing the structure of a road antenna according to first embodiment.

FIG. 1 is an illustration for schematically showing a road antenna according to the first embodiment of the present invention. In the drawing, a road antenna 104 is disposed on a post 103 and at a position elevated a predetermined height from a road surface. A laser-beam emitting device 111 is incorporated in the road antenna 104. The road antenna 104 and the laser-beam emitting device 111 are connected to a controller 112 disposed on a road R.

Figure 2:
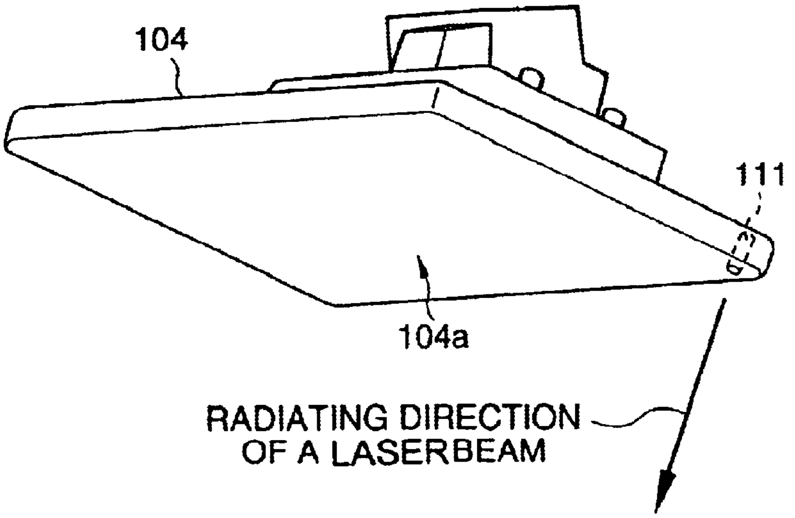
FIG. 2 is an external perspective view showing the road antenna.

FIG. 2 is an external perspective view showing the road antenna 104. The laser-beam emitting device 111 is incorporated in one corner of a plane antenna surface 104*a*. The direction in which the laser-beam emitting device 111 emits a laser beam is determined by an angle θ at which the road antenna 104 is mounted.

In the present embodiment, the direction in which the laser-beam emitting device 111 emits a laser beam (hereinafter referred to simply as an "emission direction") matches the orientation of the road antenna 104. However, the emission direction of the laser-beam emitting device 111 may differ from the orientation of the road antenna 104. Further, a plurality of laser-beam emitting devices 111 may be provided on the road antenna 104.

The operation of the road antenna will now be described. At the time of mounting of the road antenna 104, the road antenna 104 actually emits a radio wave, thus determining the distribution of electric field over the road R. On the basis of the determination result, the road antenna 104 ascertains the communications area F101 and the non-response area F102. An angle θ at which the road antenna 104 is mounted and transmission power are adjusted so as to comply with specifications.

When the communications area F101 and the non-response area F102 are embodied, a laser beam is emitted from the laser-beam emitting device 111. A target mark 113 is provided at a predetermined location on the road R onto which the laser beam is to be radiated.

Figure 3:
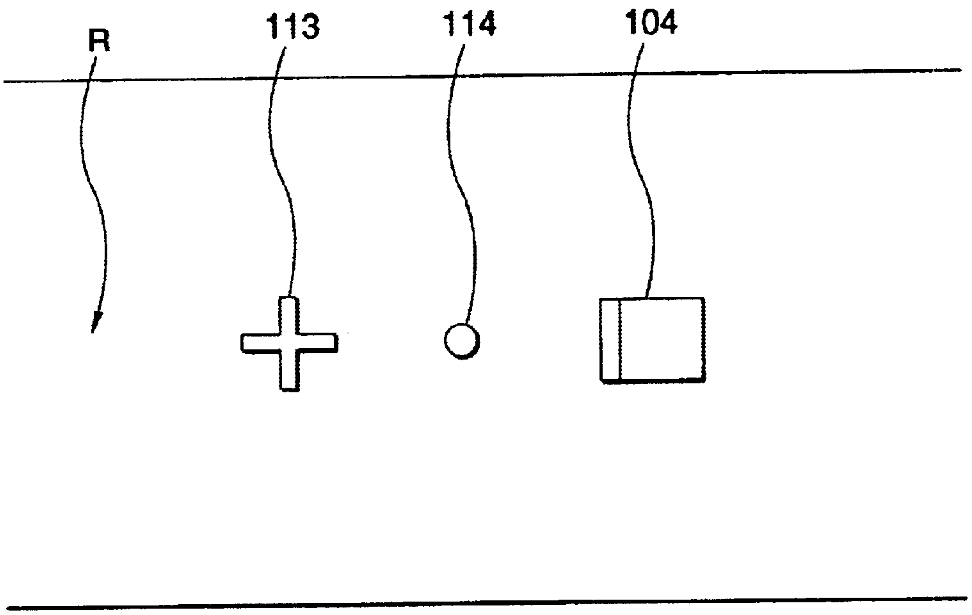
FIG. 3 is a plan view showing a position onto which a laser beam is to be radiated when the position is located away from a shot target.

In a case where no change arises in an angle θ at which the road antenna 104 is mounted, a position at which the laser beam is radiated (hereinafter referred to as a "shot position 114") remains unchanged and is situated on the target mark 113. In contrast, if a change arises in an angle θ at which the road antenna 104 is mounted, the shot position 14 is moved away from the target mark 113. FIG. 3 is a plan view showing the shot position 114 located away from the target mark 113.

Since the height "h" of the position where the road antenna 104 is disposed is known, a deviation from the mount angle θ of the road antenna 104 can be readily processed from the distance between the target mark 113 and the shot position 114. The communications area F101 and the non-response area F102 can be estimated from the thus-processed deviation from the mount angle θ. If the ETC system may have a chance of yielding a failure, the mount angle θ of the road antenna 104 can be corrected.

Embodiment 2

Figure 4:
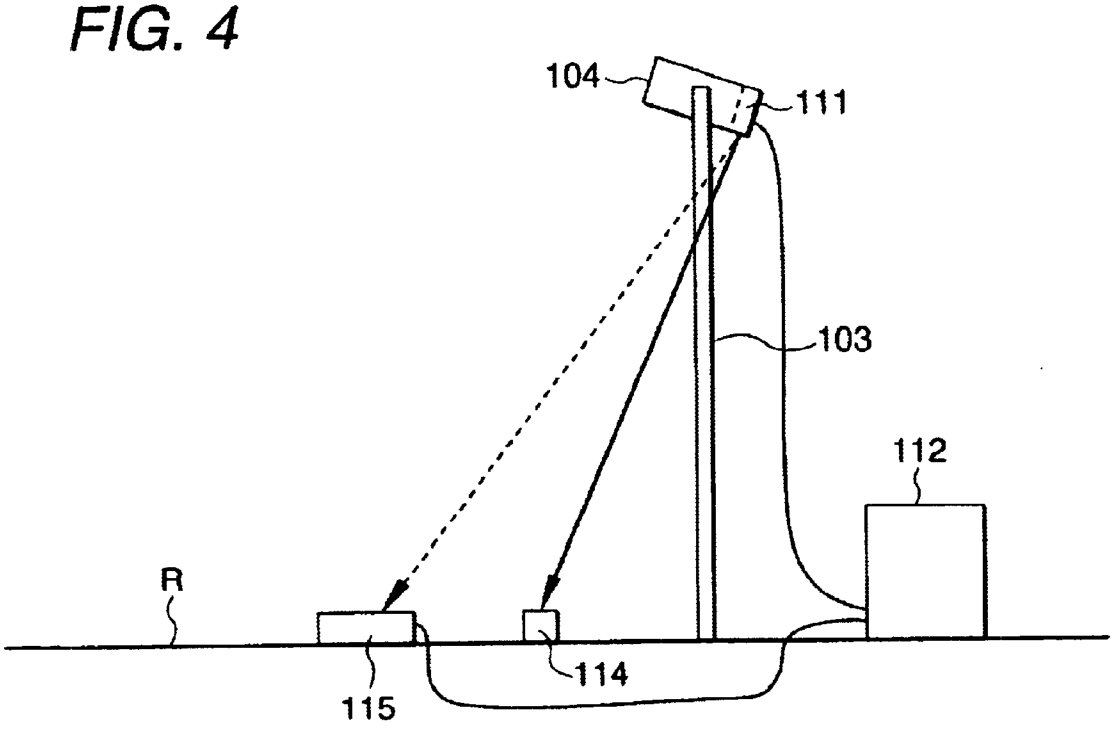
FIG. 4 is an illustration schematically showing the structure of a road antenna according to a second embodiment.

FIG. 4 is an illustration schematically showing the configuration of a road antenna according to the second embodiment of the present invention. Those elements which are the same as those described in connection with the first embodiment are assigned the same reference numerals.

In the present embodiment, at the time of installation of the road antenna 104, a laser-beam receiving device 115 is situated at the predetermined shot position 113 on the road R for receiving the laser beam emitted from the laser-beam emitting device 111. The laser-beam receiving device 115 is connected to the controller 112. In other respects, the road antenna according to the present embodiment is identical in structure with that employed in the first embodiment.

In a case where a change arises in the mount angle θ of the road antenna 104, the laser-beam receiving device 115 fails to receive the laser beam emitted from the laser-beam emitting device 111. Information about such an operation failure is transmitted to the controller 112, and the controller 112 stops the operation of the road antenna 104. If the operation of the road antenna 104 does not need to be stopped, the controller 112 may perform the function of sending an alarm message to an operator of the ETC system.

In the configuration of the road antenna shown in FIG. 4, it is expected that, even if no change arises in the mount angle θ of the road antenna 104, a laser beam is interrupted when the vehicle 101 is traveling over the road R, whereupon the laser-beam receiving device 115 cannot receive a laser beam. For this reason, the influence of interruption of a laser beam on the ascertaining of receipt of a laser beam, which would otherwise be induced by an obstacle, must be eliminated, on the basis of information about selection of position of the laser-beam receiving device 15 and information about the vehicle sensors 105.

Embodiment 3

Figure 5:
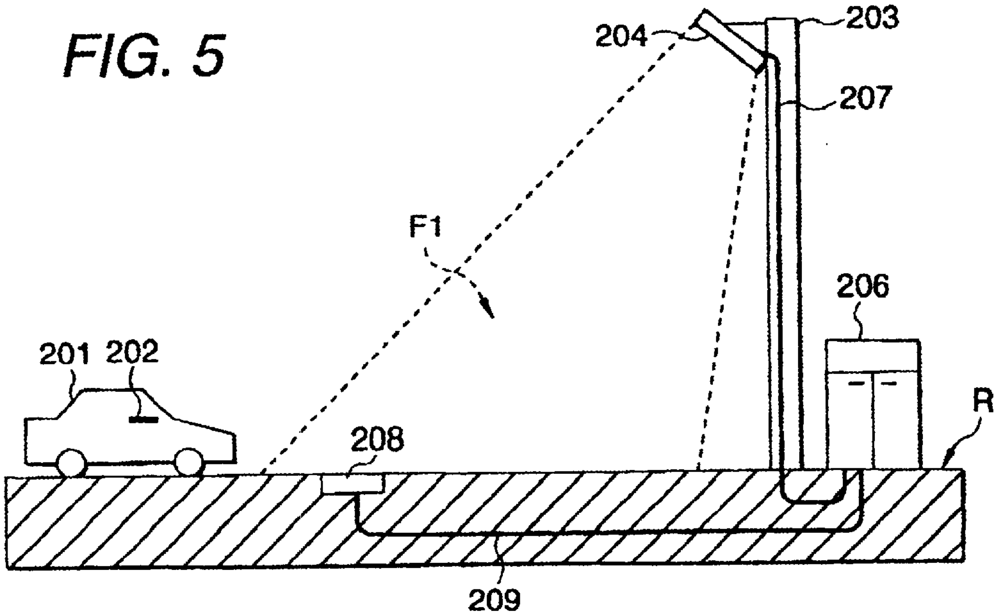
FIG. 5 is a side elevation view schematically showing an electric toll collection system to which a road antenna according to third embodiment.

FIG. 5 is a side elevation view schematically showing an electric toll collection (ETC) system to which a road antenna according to the third embodiment of the present invention is applied.

In the drawing, a road antenna 204 is disposed on a post 203 and at a position elevated a predetermined height from a road surface. Radio communication is established between the road antenna 204 and the on-vehicle device 202. Further, a radio controller 206 is disposed in the vicinity of a post 203 and on one side of a road R. The radio controller 206 is connected to the road antenna 204 via a control line 207.

A receiver 208 for receiving a radio wave emitted from the road antenna 204 is disposed at a predetermined location on the surface of the road R. The receiver 208 is connected to the radio controller 206 via a connection line 209.

Figure 6:
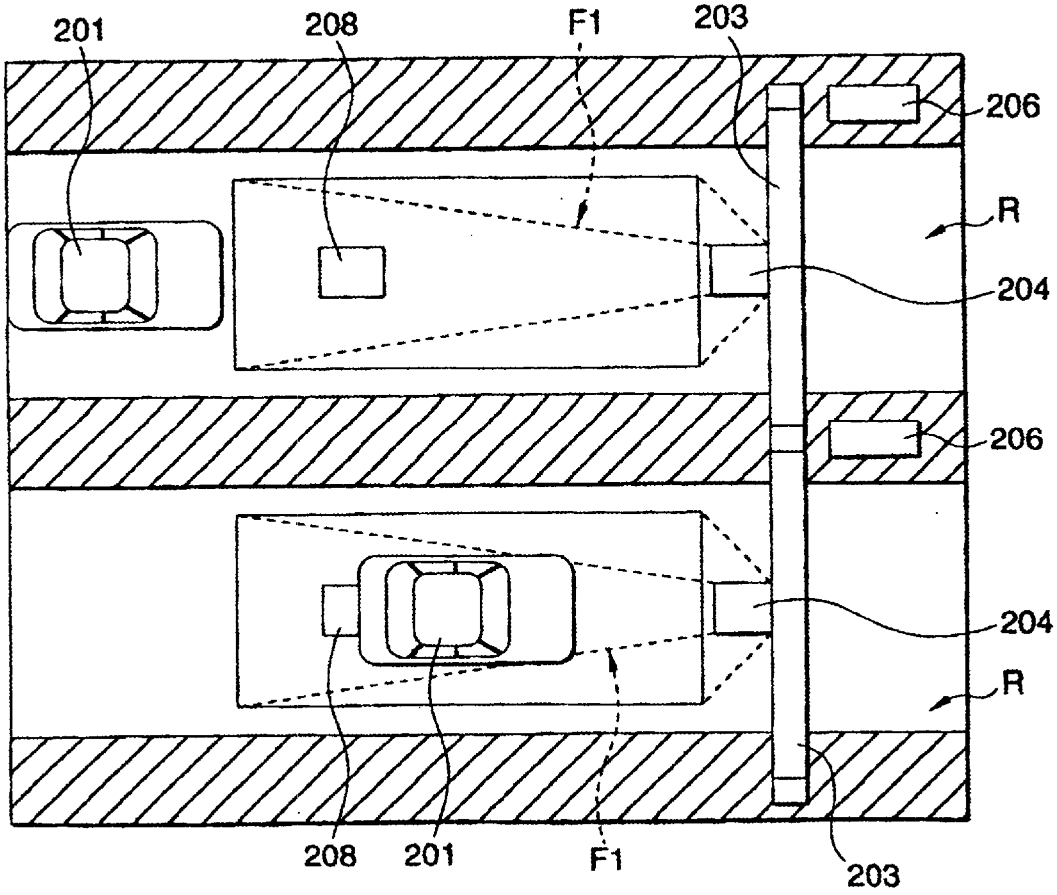
FIG. 6 is a plan view showing the electric toll collection system shown in FIG. 5.

FIG. 6 is a plan view of an electric toll collection (ETC) system shown in FIG. 5. The communications area F21 is a range in which radio communication can be established between the on-vehicle device 202 and the road antenna 204. The receiver 208 is disposed at a predetermined position on the road R and within the communications area F21.

Figure 7:
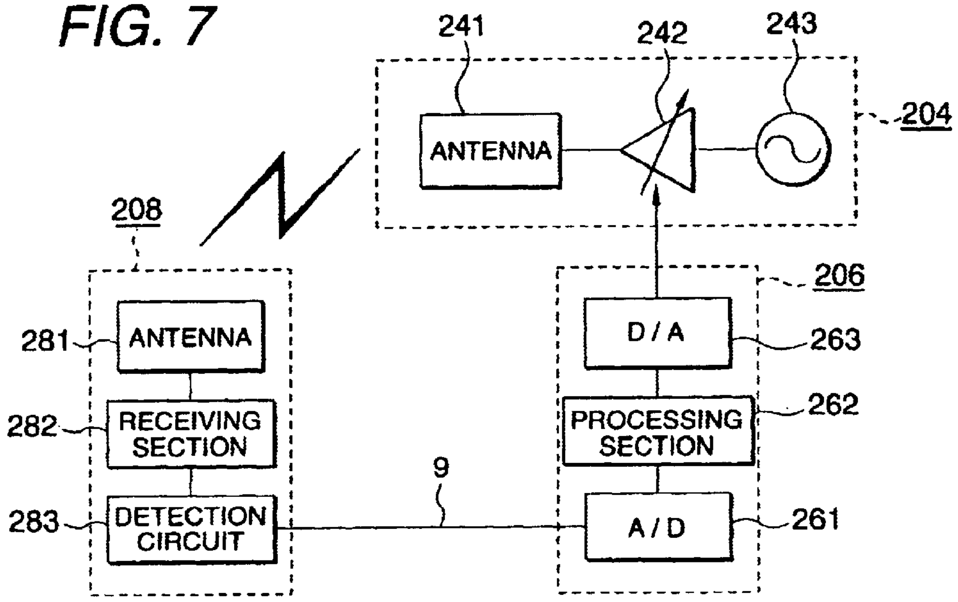
FIG. 7 is a block diagram showing the road antenna according to third embodiment.
Figure 8:
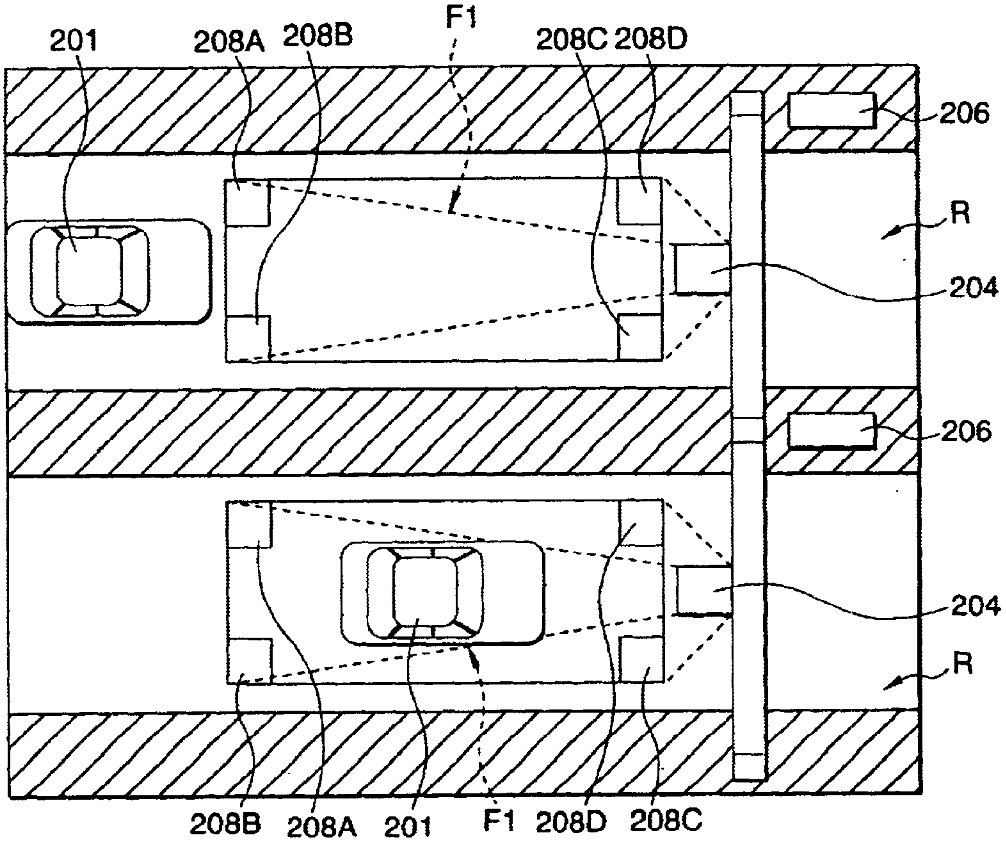
FIG. 8 is a plan view showing an electric toll collection system according to fourth embodiment of the present invention.
Figure 9:
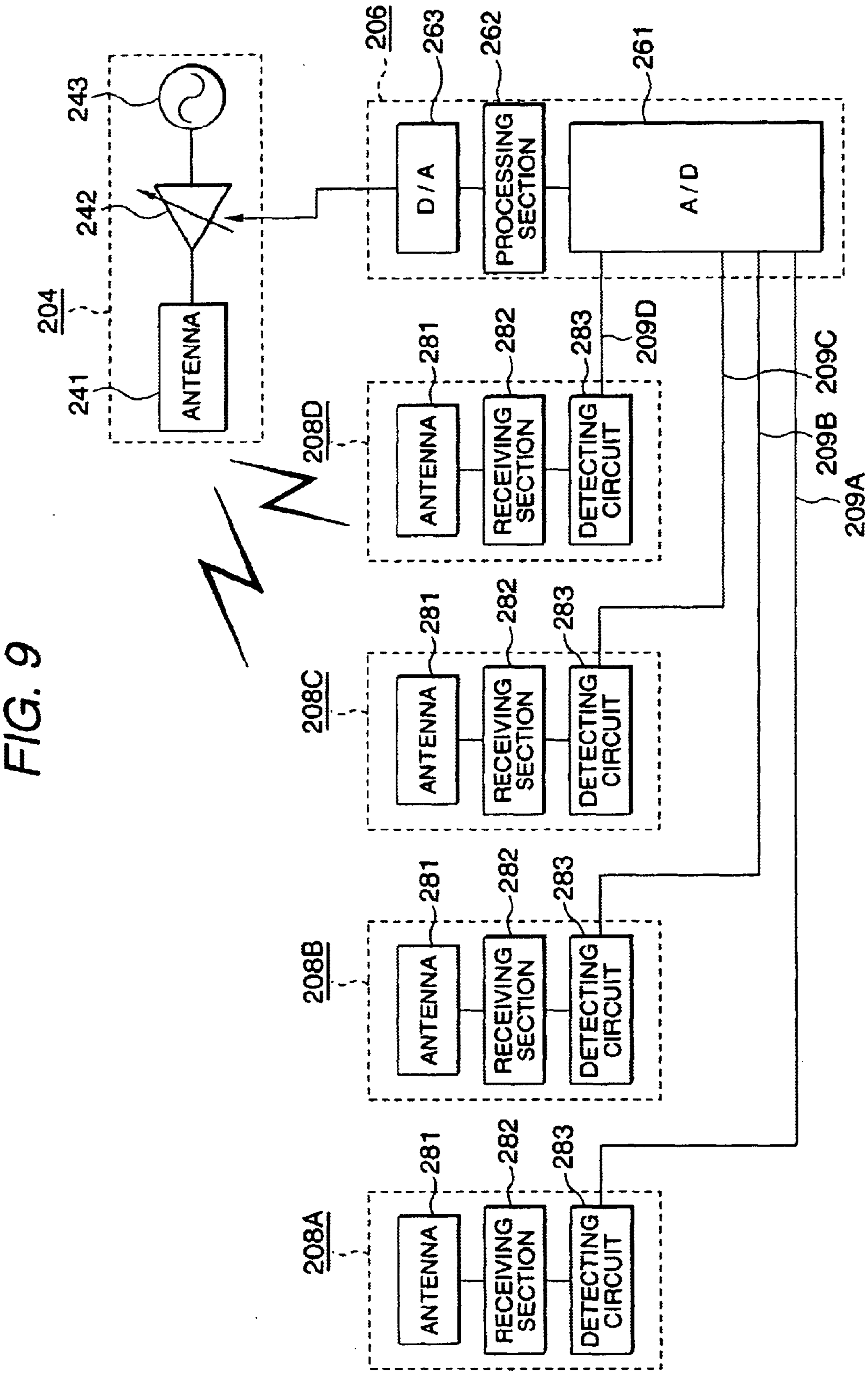
FIG. 9 is a block diagram showing the road antenna according to fourth embodiment.

FIG. 7 is a block diagram showing the configuration of the road antenna 204 according to the present embodiment. The road antenna 204 comprises an antenna section 241, a variable amplifier 242, and a signal source 243 of 5.8 GHz band.

Further, the radio controller 206 comprises an analog-to-digital conversion section 261 for converting, into a digital signal, a signal entered by the receiver 208 by way of the connection line 209; a processing section 262; and a digital-to-analog conversion section 263 for converting, into an analog signal, a signal output from the processing section 262. The receiver 208 comprises an antenna section 281 for receiving a radio wave output from the road antenna 204; a receiving section 282; and a detection circuit 283 for detecting a received radio wave.

The radio wave emitted from the antenna section 241 of the road antenna 204 is received by an antenna section 281 and a receiving section 282 of the receiver 208. In the receiver 208, a detection circuit 283 detects the received radio wave and outputs a voltage signal proportional to receiving power to the radio controller 206.

In the radio controller 206, the voltage signal output from the detection circuit 283 by way of the control line 209 is converted into a digital signal by means of the analog-to-digital conversion section 261. The processing section 262 determines transmission power and outputs control data to be used for adjusting the transmission power of the road antenna 204. The control data are delivered to the digital-to-analog conversion section 263, where the data are converted into an analog control signal.

The thus-converted analog control signal is used for controlling the degree of amplification of the variable amplifier 242. An initial value of transmission power is stored in the processing section 262 beforehand. The degree of amplification of the variable amplifier 242 is controlled through use of a feedback loop until transmission power becomes close to the initial value, thereby maintaining constant the transmission power of the road antenna 204 used for transmitting a radio wave.

Embodiment 4

FIG. 4 is a side elevation view schematically showing an electric toll collection (ETC) system to which a road antenna according to the fourth embodiment of the present invention is applied. Those reference numerals which are the same as those described in connection with the third embodiment are assigned the same reference numerals.

In the present embodiment, four receivers 208A, 208B, 208C, and 208D are disposed at corresponding four corners of the communications area F21 formed on the road R. In other respects, the ETC system is identical in structure with that employed in the third embodiment.

FIG. 5 is a block diagram showing the structure of a road antenna according to the fourth embodiment. The receivers 208A through 208D disposed at the respective four corners of the communications area F21 are connected to the radio controller 206 by way of corresponding control lines 209A through 209D.

Each of the receivers 208A through 208D comprises an antenna section 281, a receiving section 282, and a detection circuit 283. The radio controller 206 has the analog-to-digital conversion section 261 for converting into a digital signal a voltage signal output from the detection circuit 283 of each of the receivers 208A through 208D. The analog-to-digital conversion section 261 is formed from, for example, four analog-to-digital converters which are arranged in a side-by-side configuration.

The radio wave emitted from the antenna section 241 of the road antenna 204 is received by the antenna section 281 and the receiving section 282 of each of the receivers 208A through 208D. The detection circuit 283 detects the radio wave received by each of the receivers 208A through 208D and outputs a voltage signal proportional to the receiving power used for receiving the radio wave is output to the radio controller 206.

The radio controller 206 receives the voltage signal which is output from the detection circuits 283 of each of the receivers 208A through 208D by way of a corresponding one of the connection lines 209A through 209D. The thus-received voltage signal is converted into a digital signal by the analog-to-digital conversion section 261. The processing section 262 compares a predetermined value with four digital signals, and the angle at which the road antenna 204 is mounted is detected on the basis of a comparison result.

For example, in a case where the voltage signals output from the receivers 208A and 208D are large and the voltage signals output from the receivers 208B and 208C are small, it is determined that the road antenna 204 is inclined to left with respect to the direction in which the vehicle 201 is traveling. If a great inclination has arisen in the road antenna 204, a radio wave may interfere with radio communication established by a vehicle which is traveling on an adjacent lane. In order to prevent such an interference, an alarm is issued.

Embodiment 5

Figure 10:
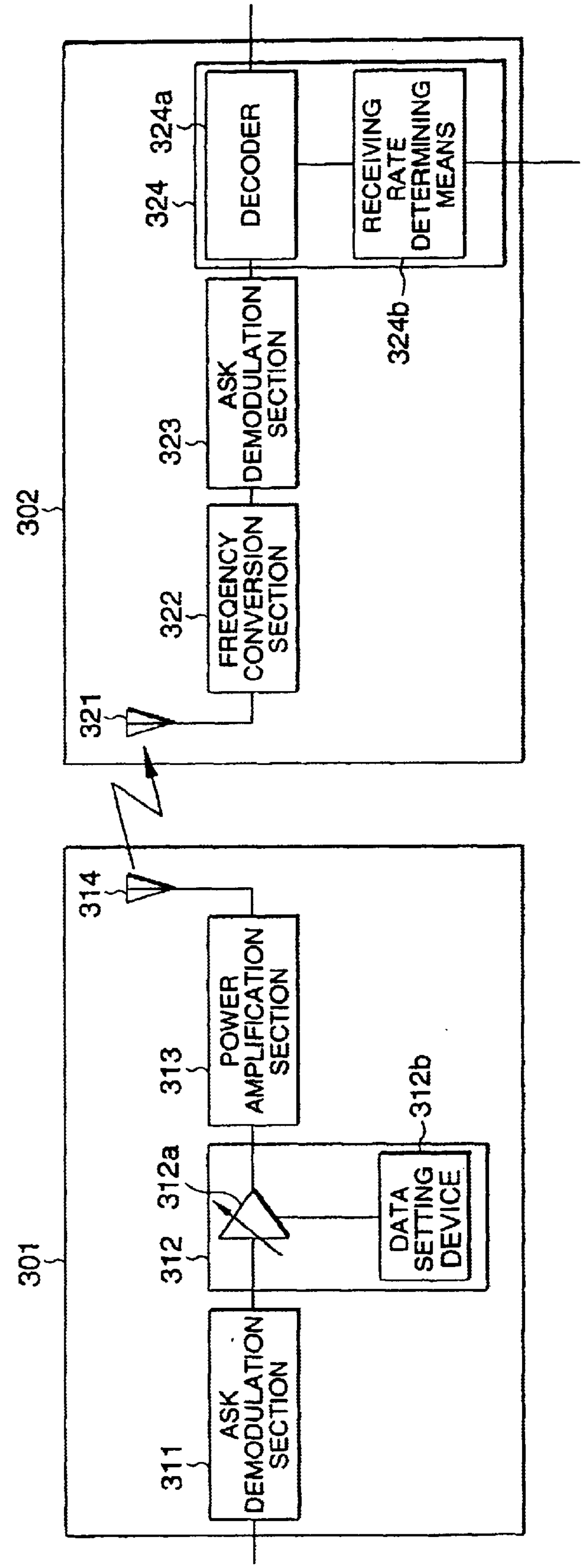
FIG. 10 is a block diagram showing a radio system according to fifth embodiment.

FIG. 10 is a diagram showing the structure of a radio system according to the fifth embodiment of the present invention, the system adopting an ASK (amplitude shift keying) scheme.

In FIG. 10, reference numeral 301 designates a transmission section; 311 designates an ASK (amplitude shift keying) modulation section; 312 designates gain control section; 313 designates a power amplification section; and 314 designates an antenna. The gain control section 312 is made up of a voltage-controlled amplifier 312*a* and a data setting device 312*b*.

Reference numeral 302 designates a receiving section of other party; 321 designates an antenna; 322 designates frequency conversion section; 323 designates an ASK (amplitude shift keying) demodulation section; and 324 designates decode section. The decode section 324 is made up of a demodulator 324*a* and receiving rate determination means 324*b*.

The operation of a transmission output control circuit having the foregoing configuration will now be described. In the transmission section 301, an ASK (amplitude shift keying) modulation signal produced by the ASK modulation section 311 is amplified to a desired level by the power amplification section 313 after having passed through the gain control section 312. The thus-amplified signal is transmitted as a radio wave from the antenna 314. The gain control section 312 determines the gain of the voltage-controlled amplifier 312*a* in accordance with the settings of the data setting device 312*b*.

Figure 12A:
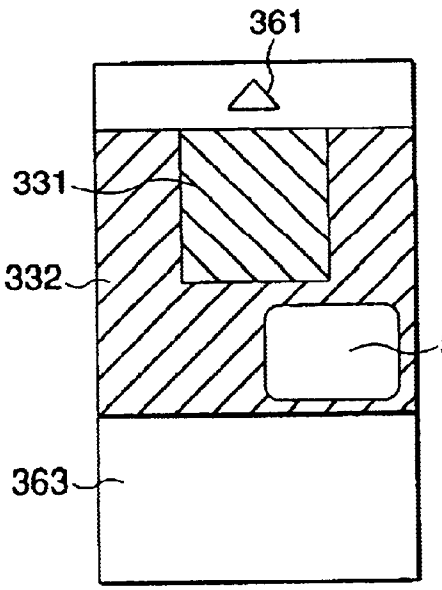
FIGS. 12A and 12B are diagrams for describing an operation for setting a communications area according to fifth embodiment.
Figure 12B:
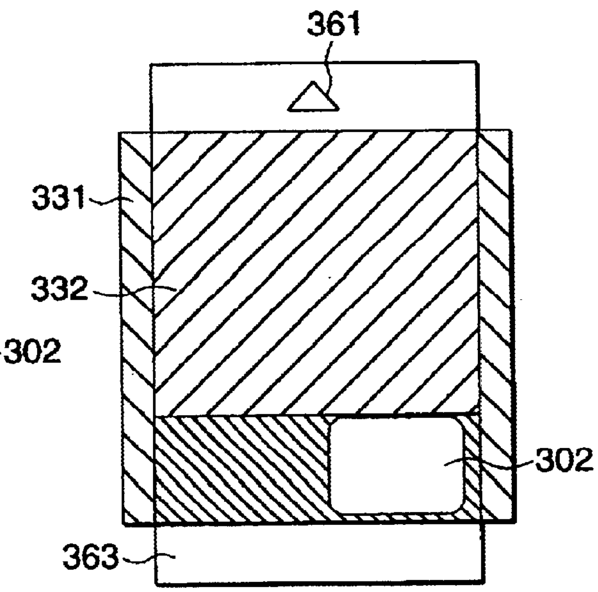

The receiving section 302 is disposed at an arbitrary location in the lane 363 shown in FIGS. 12A and 12B and performs a receiving operation. In FIG. 10, a high-frequency signal received by the antenna 321 is converted into an intermediate frequency by means of the frequency conversion means 322, and the intermediate frequency is demodulated into an ASK (amplitude shift keying) signal by the ASK demodulation section 323. The thus-demodulated signal is converted into digital data by the demodulator 324*a* of the decode section 324. Simultaneously, the receiving rate determination means 324*b* determined, on a per-frame basis, whether or not the received signal is correct transmission data.

Figure 11:
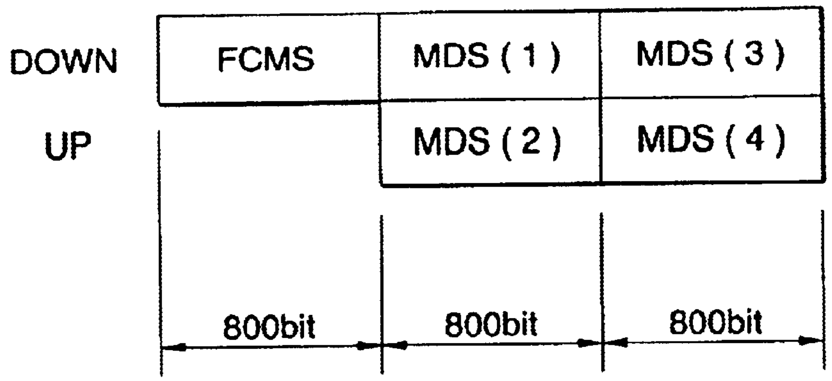
FIG. 11 shows an frame format example employed in an electric toll collection system.

FIG. 11 shows an example frame format employed in the ETC system. The receiving section 302 shown in FIG. 10 receives an FCMS slot and either an MDS(1) slot or an MDS(3) slot shown in FIG. 11. Each slot contains an error detection code of 16-bit CRC (cyclic redundancy check) and determines whether or not received data are correct data.

By reference to FIGS. 12A and 12B, the control of a transmission output of the transmission section 1 shown in FIG. 10 will now be described. In the antenna shown in FIGS. 12A and 12B, reference numeral 331 designates an area covered by a road antenna 361; 332 designates a desired communications area; and 302 designates the receiving section 302.

FIG. 12A shows a situation in which the receiving section 302 located within the desired communication area 332 cannot establish communication, because the coverage area 331 formed by the road antenna 361 is narrow. At this time, the result of the measurement performed by the receiving rate determination means 324*b* of the receiving section 302 shows that communication is not feasible. In order to enable communication, the data setting device 312*b* of the transmission section 301 shown in FIG. 10 is reset. The gain of the voltage-controlled amplifier 312*a* is increased until the result of the measurement performed by the receiving rate determination means 324*b* of the receiving section 302 shows that communication is feasible. The receiving rate determination means 324*b* measures a receiving rate on a per-frame basis, and the gain (transmission output) of the voltage-controlled amplifier 312*a* is fixedly set while the measurement result shows that communication is feasible. As a result, the coverage area 331 formed by the road antenna 361 is correctly set while the receiving section 302 is located within the desired communications area 332, thereby rendering the entirety of the desired communications area 332 receivable.

FIG. 12B shows a situation in which the receiving section 302 located outside the communications area 332 has established communication because of the wide coverage area formed by the road antenna 361. At this time, the result of the measurement performed by the receiving rate determination means 324*b* of the receiving section 302 shows that communication is feasible. In this case, the data setting device 312*b* of the transmission section 301 is reset, and the receiving rate determination means 324*b* of the receiving section 302 measures a receiving rate on a per-frame basis. The gain of the voltage-controlled amplifier 312*a* is decreased until the measurement result shows that communication is not feasible. The gain of the voltage-controlled amplifier 312*a* is fixedly set while the result of the measurement performed by the receiving rate determination means 324*b* shows that communication is not feasible. As a result, the coverage area 331 formed by the road antenna 361 is appropriately set so that the receiving section 302 located outside the desired communications area 332 becomes unreceivable.

In this embodiment, the receiving rate determination means 324*b* of the receiving section 302 measures a receiving rate on a per-frame basis, and the gain of the voltage-controlled amplifier 312*a* of the transmission section 301 is controlled on the basis of the measurement result, thereby ensuring the desired communications area 332.

Embodiment 6

Figure 13:
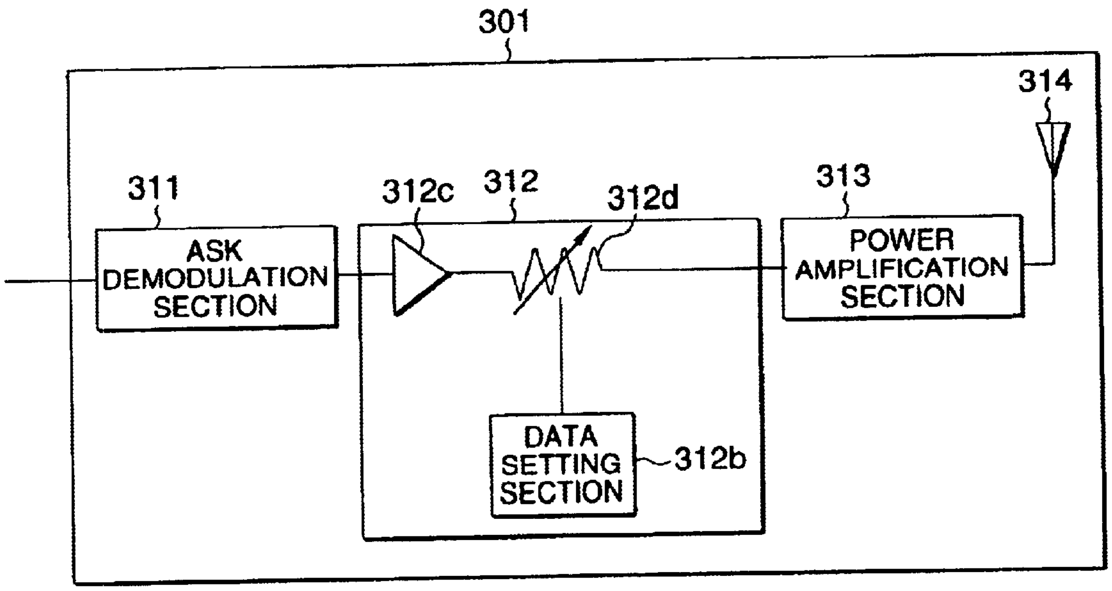
FIG. 13 is a block diagram showing the configuration of a transmitter according to sixth embodiment.

The sixth embodiment of the present invention will now be described by reference to a block diagram shown in FIG. 13. As illustrated, the transmission section of the present embodiment is identical in configuration with that shown in FIG. 10, except that the configuration of the gain control section 312 is changed. Explanation of the identical configuration is omitted here. The gain control section 312 according to the sixth embodiment is made up of an amplifier 312*c* and a voltage-controlled attenuator 312*d.*

In such a configuration, the amount of attenuation of the voltage-controlled attenuator 312*d* of the transmission section 301 is determined in accordance with the settings of the data setting device 312*b*, thereby setting a transmission output. The receiving rate measurement means 324*b* of the receiving section 302 measures a receiving rate on a per-frame basis. The amount of attenuation of the voltage-controlled attenuator 312*d* of the transmission section 301 is variably controlled, thereby ensuring the desired communications area 332. At this time, it is recommendable to ensure the desired receiving area 332 in accordance with procedures analogous to those employed in the setting example (FIG. 12) mentioned previously.

Embodiment 7

Figure 14:
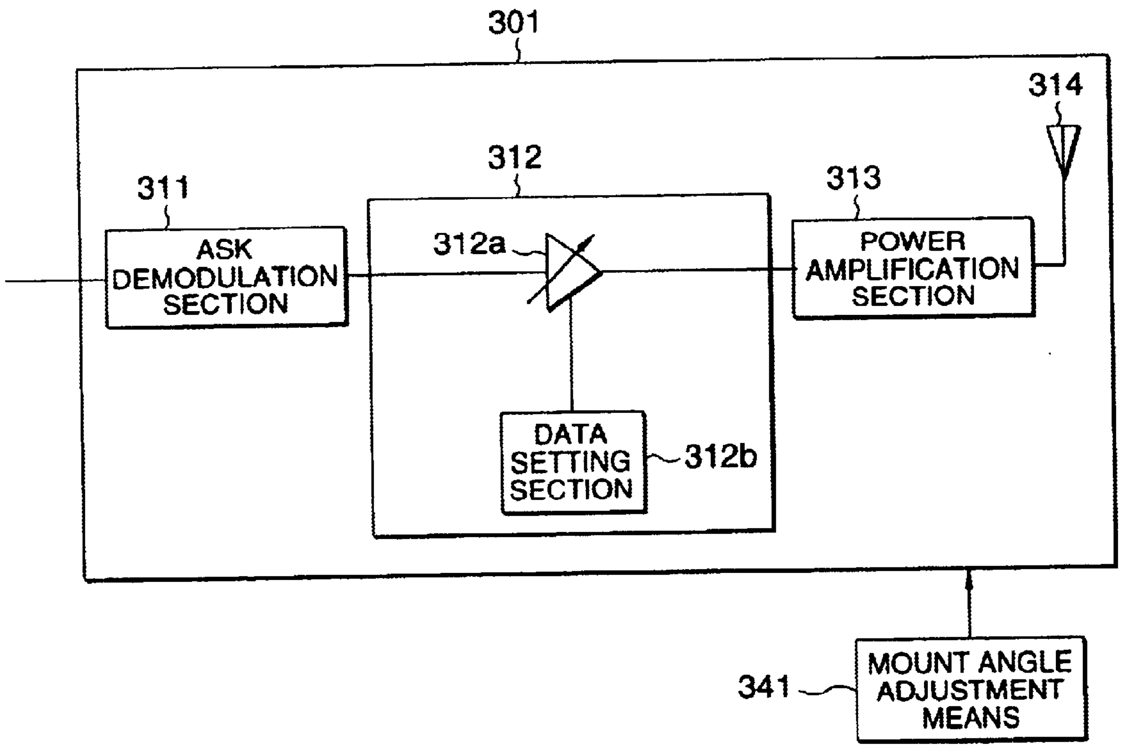
FIG. 14 is a block diagram showing the configuration of a transmitter according to seventh embodiment of the present invention.
Figure 15:
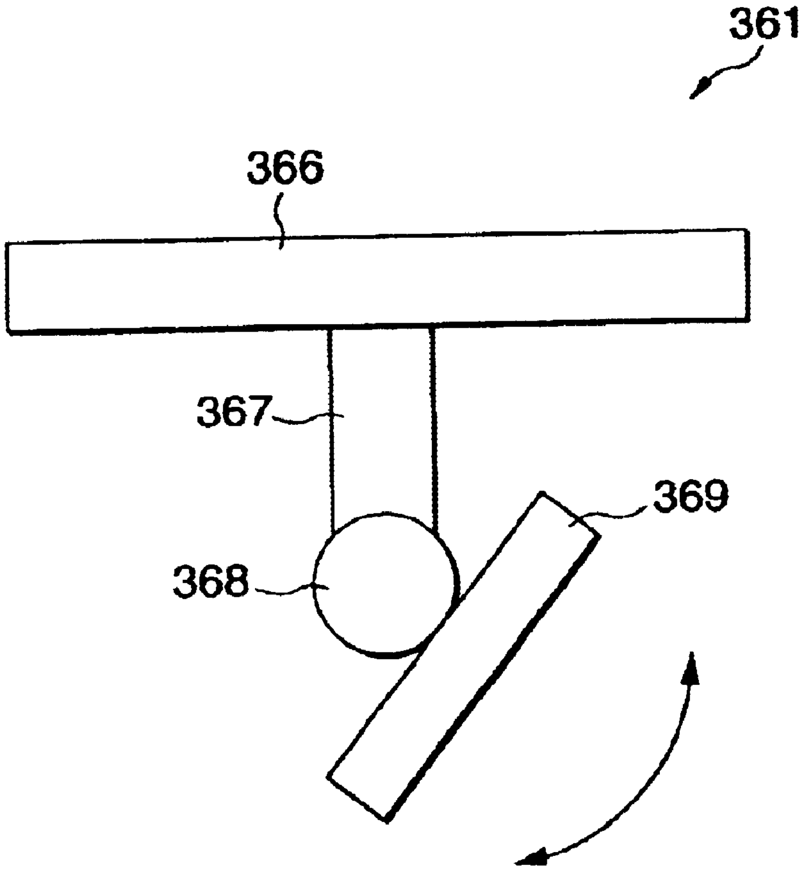
FIG. 15 is a diagram showing the configuration of a road antenna according to seventh embodiment.

The seventh embodiment of the present invention will now be described. FIG. 14 is a block diagram showing another example configuration of the transmission section 301. According to the seventh embodiment, as shown in FIG. 14, the transmission section 301 is additionally provided with mount angle adjustment means 341. FIG. 15 shows an example configuration of the road antenna 361. The road antenna 361 comprises a gantry 366, a post 367, a mount angle adjuster 368, and a road antenna main unit 369.

Figure 36:
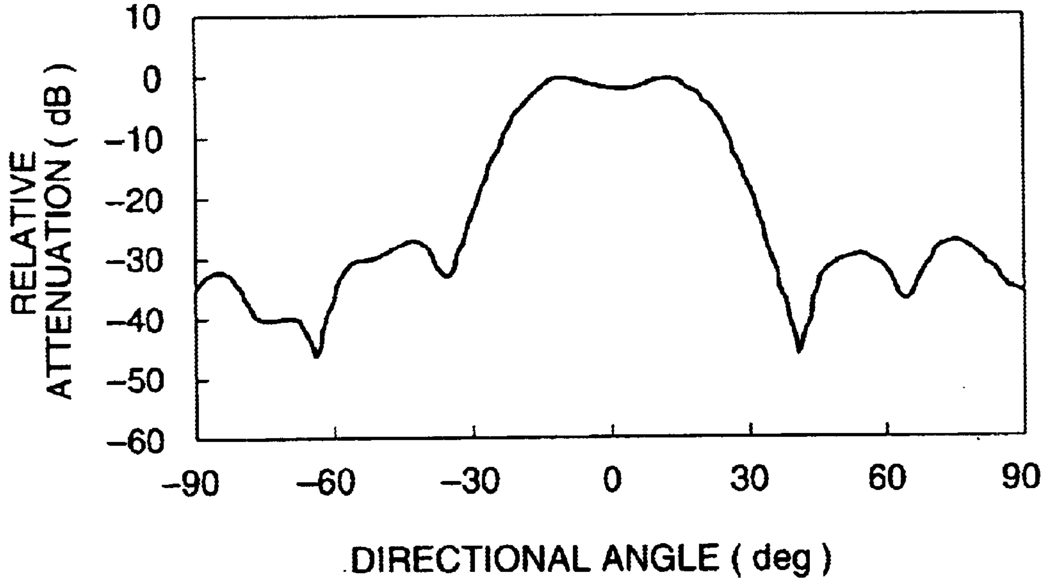
FIG. 36 is a diagram showing an example directional pattern of a road antenna.
Figure 37A:
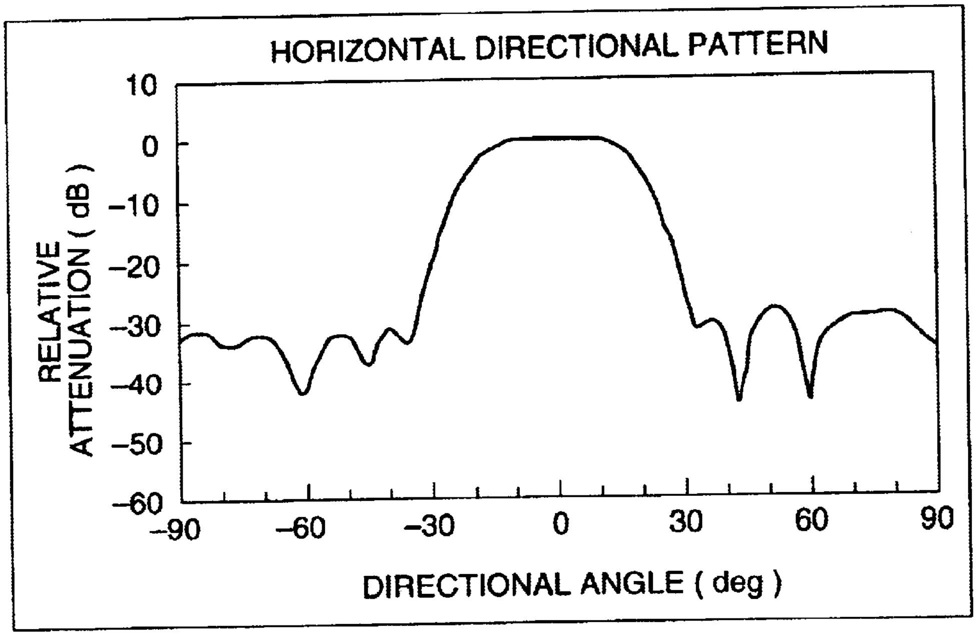
Figure 37B:
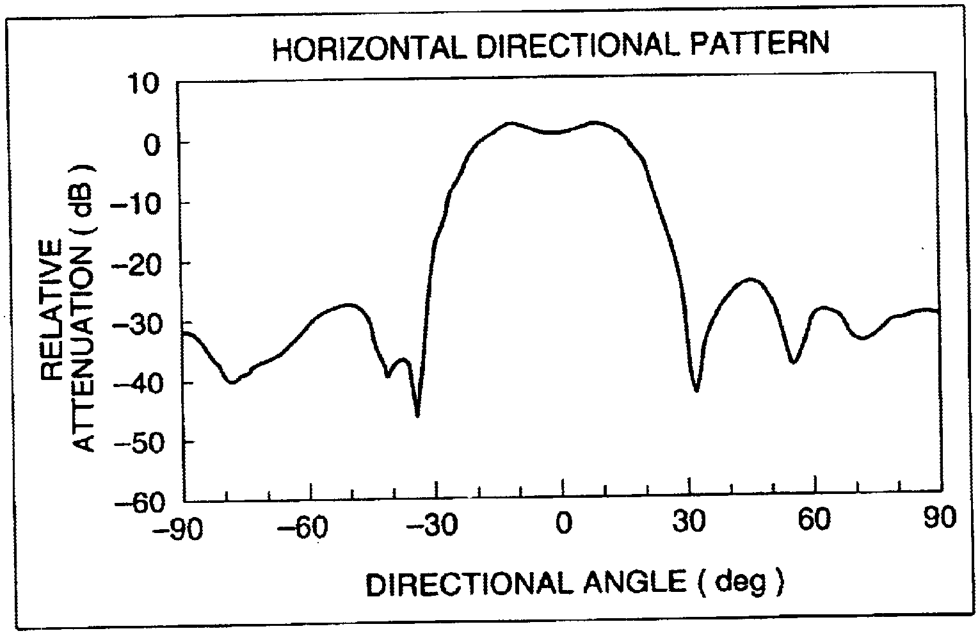
Figure 38:
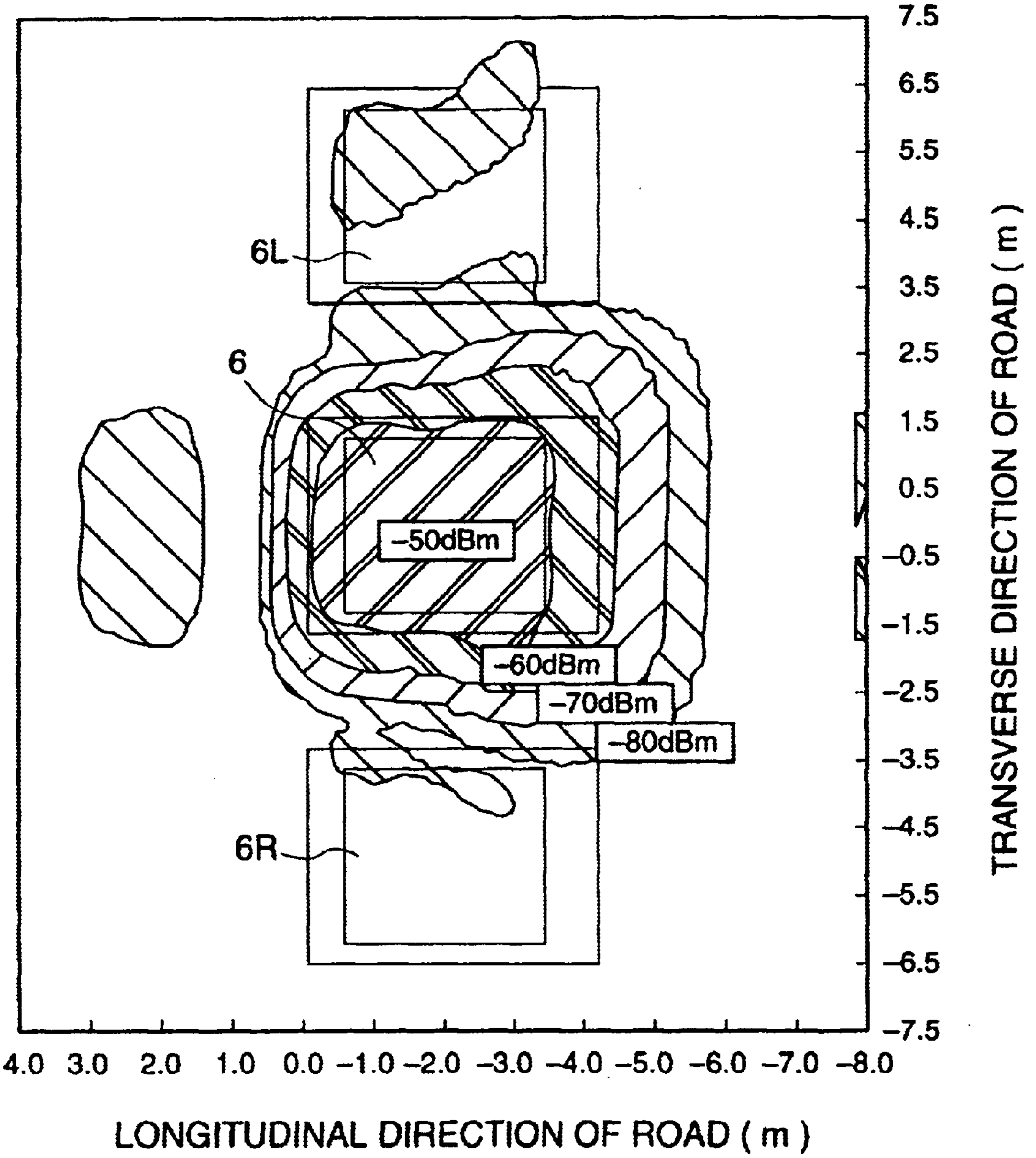
FIG. 38 is an illustration showing an example communications area formed by a radio wave emitted from the road antenna.
Figure 39:
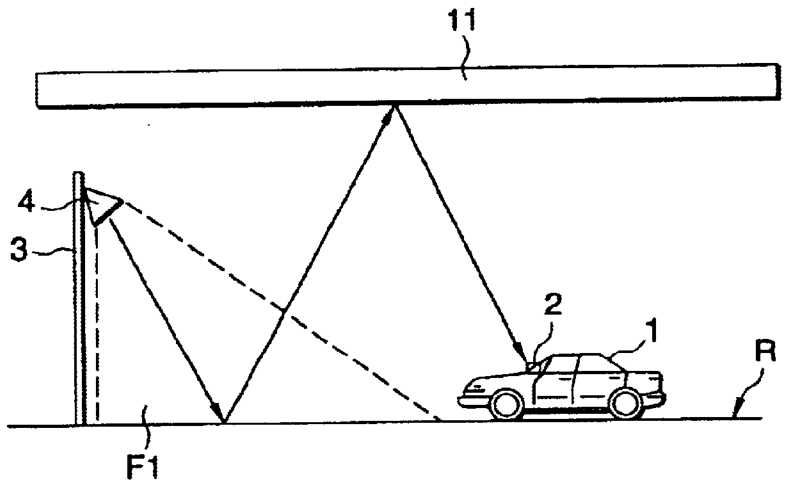
FIG. 39 is an illustration showing reflection of a radio wave off a roof-shaped structure.
Figure 40:
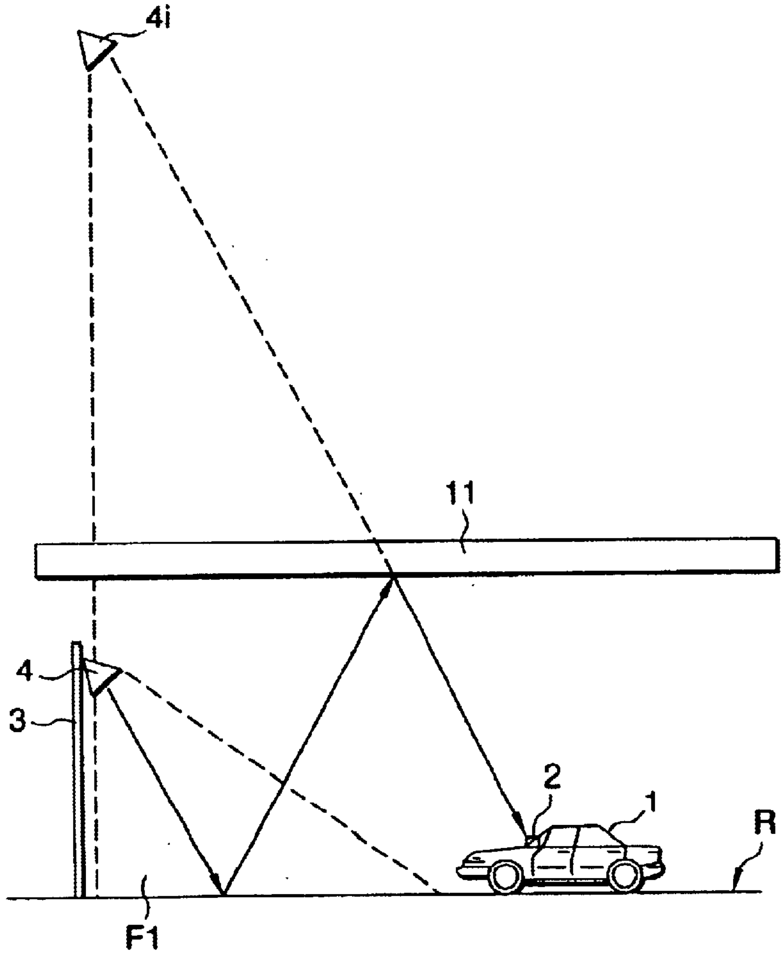
FIG. 40 is an illustration showing reflection of a radio wave off a mirror-image antenna.
Figure 41:
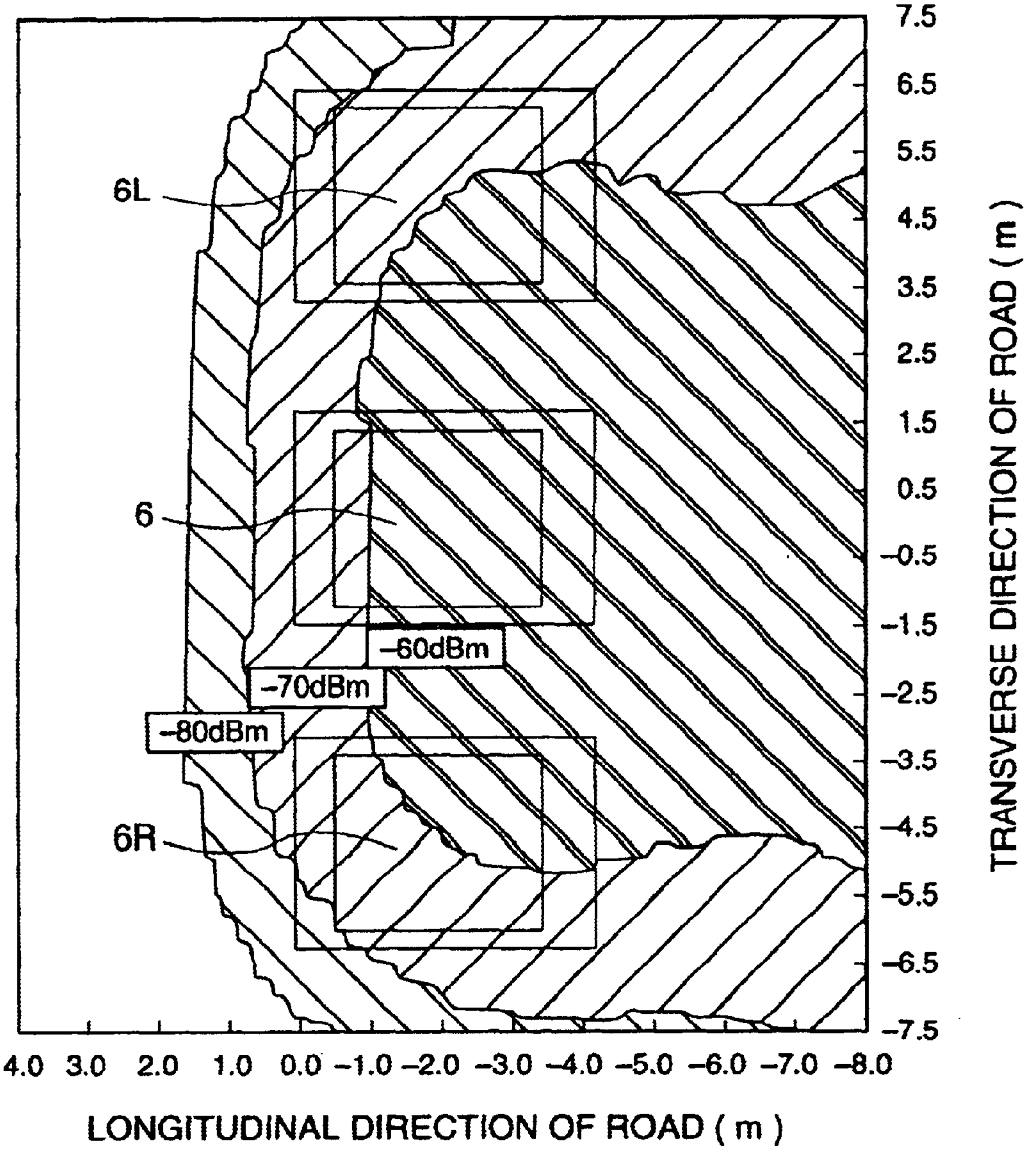
FIG. 41 is an illustration showing an example communications area formed by the radio wave reflected by the roof-shaped structure.

In the above-described configuration, the angle of the mount angle adjuster 368 is determined in accordance with the settings of the mount angle adjustment means 341. The receiving rate measurement means 324*b* of the receiving section 302 receives a receiving rate on a per-frame basis, thereby ensuring a desired communications area. More specifically, the road antenna 361 has a directional pattern such as that shown in FIG. 36. A communications area is moved by means of changing the mount angle of the road antenna 361. On the basis of the receiving rates which have been measured on a per-frame basis, the mount angle adjuster 368 adjusts the angle of the road antenna main unit 369, by means of varying the settings of the mount angle adjustment means 341 such that the desired communications area 332 is achieved.

The present invention is not limited to the above-described embodiments, and the ASK modulation section, the gain controller, the power amplification section, the antenna, the frequency conversion means, the ASK demodulation section, the decode means, and the mount angle adjustment means can be modified variously within the scope of the invention.

Although the previous embodiments have described a radio system adopting an amplitude shift keying (ASK) scheme, the present invention can also be applied to a frequency shift keying (FSK) scheme or a phase shift keying (PSK) scheme. For example, if an FSK modulation section for generating an FSK modulation signal is employed as a substitute for the ASK modulation section 311 and an FSK demodulation section for demodulating an FSK modulation signal is employed as a substitute for the ASK demodulation section 323, a radio system of FSK scheme can be employed. Similarly, when a PSK modulation section is employed as a substitute for the ASK modulation section 311 and a PSK demodulation section is employed as a substitute for the ASK demodulation section 323, a radio system of PSK scheme can be employed.

Embodiment 8

Figure 16:
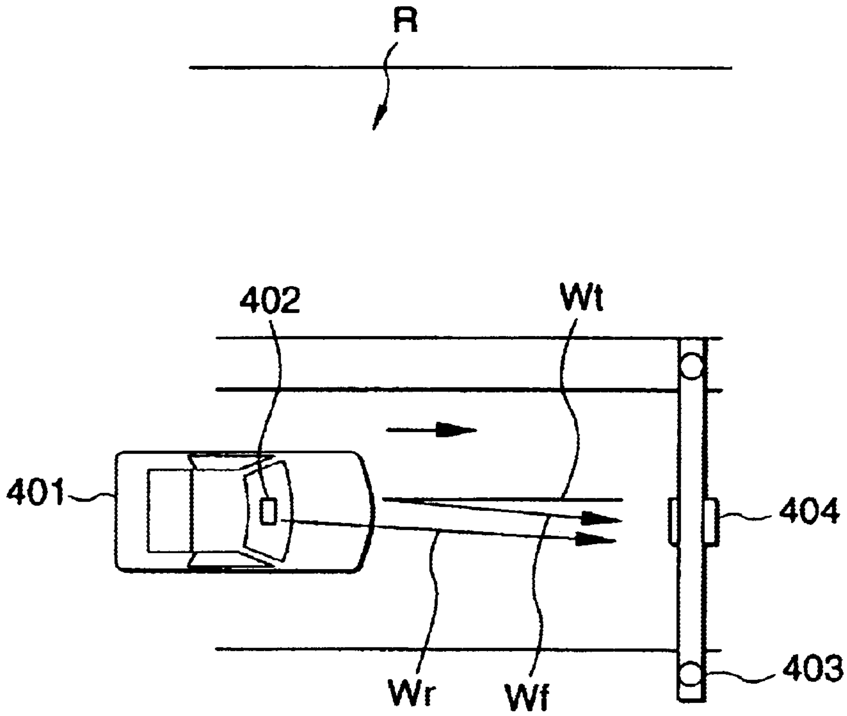
FIG. 16 is a plan view showing the overall structure of a road antenna according to eighth embodiment, wherein normal radio communication is established with a vehicle in a lane in which the road antenna is disposed.
Figure 17:
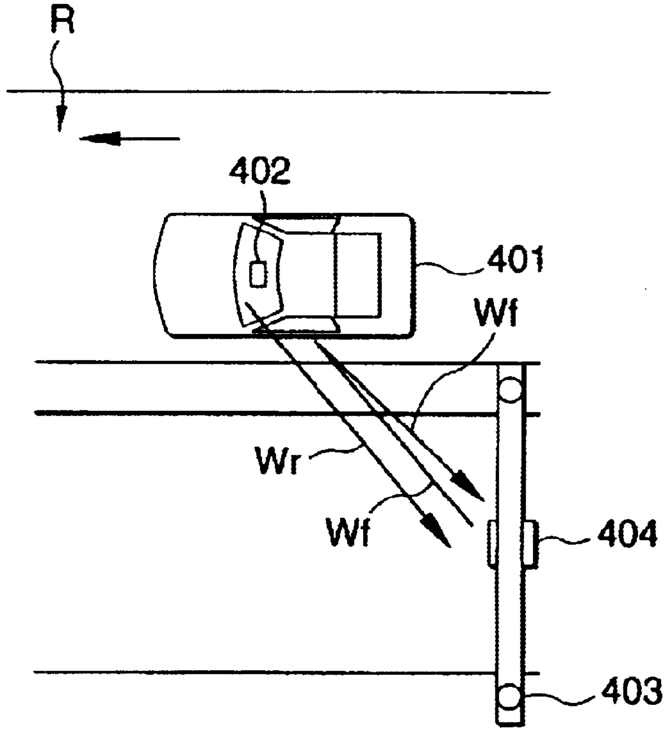
FIG. 17 is a plan view showing the overall structure of the road antenna according to eighth embodiment, wherein establishment of erroneous communication with an oncoming vehicle in the opposite lane is prevented.

FIGS. 16 and 17 are plan view showing the overall structure of a road antenna according to the eighth embodiment of the present invention. FIG. 16 shows normal radio communication established with a vehicle traveling in a lane in which the antenna is disposed, and FIG. 17 shows prevention of erroneous communication with a vehicle traveling on the opposite lane.

As shown in FIGS. 16 and 17, a road antenna 404 mounted on a post 403 transmits a transmission wave Wt to a vehicle 401 and receives a receipt wave transmitted from an on-vehicle device 402 mounted in the vehicle 401, thereby establishing radio communication with the on-vehicle device 402. Simultaneously, the transmission wave Wt is reflected by the vehicle 401, thereby causing a reflected wave Wf. The road antenna 404 also receives the reflected wave Wf.

As an undulation source (i.e., the traveling vehicle 401) approaches an observer (i.e., the road antenna 404), the frequency of the reflected wave Wf becomes greater than that of the transmission wave Wt. In contrast, as the undulation source departs from the observer, the frequency of the reflected wave Wf becomes lower than that of the transmission wave Wt. The traveling direction of the traveling vehicle 401 can be processed through such use of the Doppler effect. Consequently, if the vehicle 401 is traveling on the opposite lane, the antenna system 404 can prevent establishment of radio communication with the on-vehicle device 402 mounted in the vehicle 401.

Figure 18:
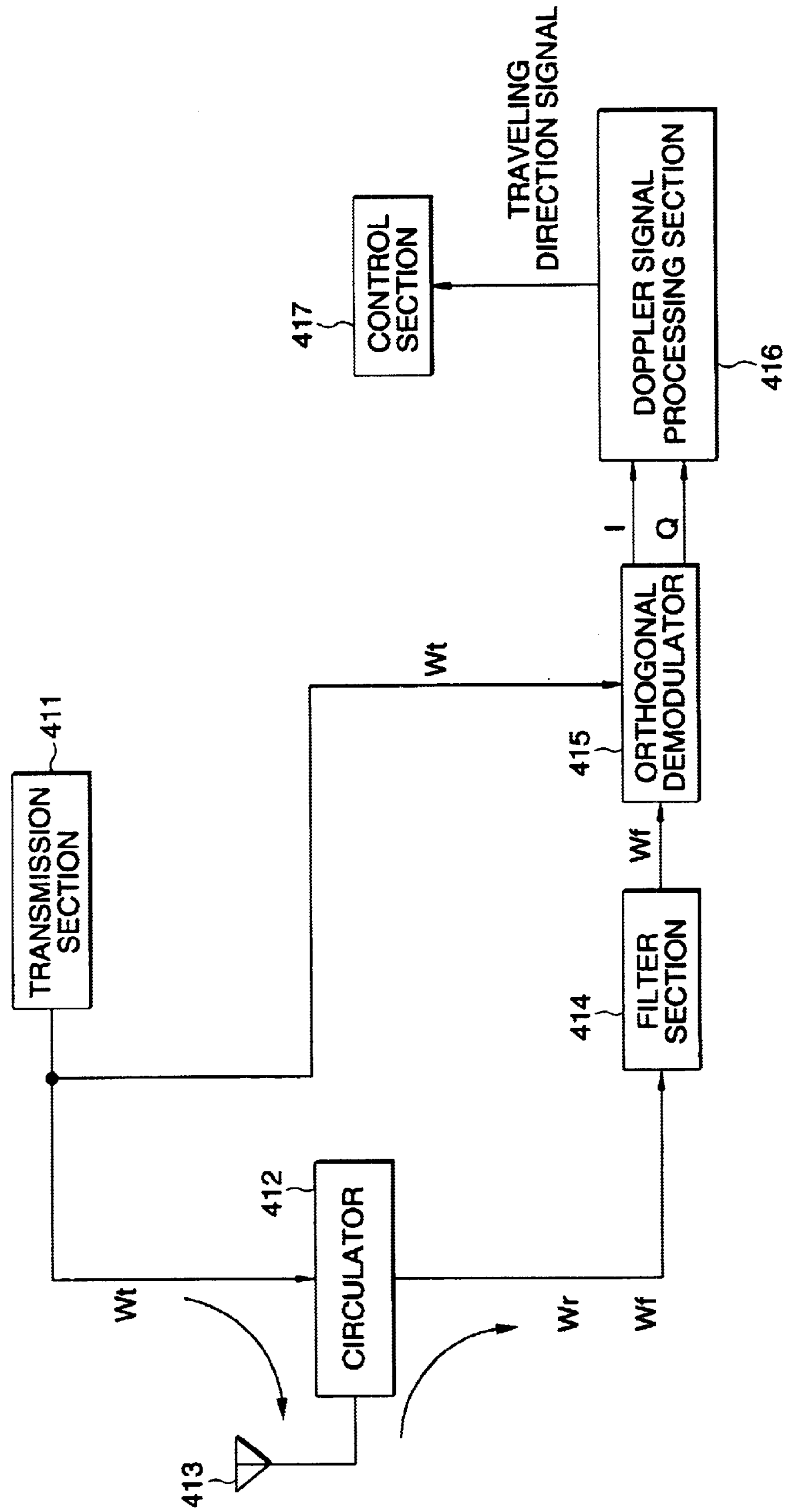
FIG. 18 is a block diagram showing the road antenna according to eighth embodiment.

FIG. 18 is a block diagram showing the configuration of the road antenna according to the eighth embodiment. In this drawing, the transmission wave Wt output from the transmission section 411 is output to only the antenna section 413 by means of a circulator 412. The antenna section 413 transmits the transmission wave Wt to the outside of the road antenna 404.

After the transmission wave Wt has been received by the on-vehicle device 402 mounted in the vehicle 401, the antenna section 413 receives the receipt wave Wr transmitted from the on-vehicle device 402 and the reflected wave Wf ($wt\pm\Delta$) which results from the transmission wave Wt being reflected by the vehicle 401 and shifts in proportion to the speed of the vehicle 401. The thus-received waves are output to a filter section 414 by the circulator 412.

The filter section 414 permits passage of only the reflected wave Wf after having removed the receipt wave Wr. The reflected wave Wf is mixed with the transmission wave Wt by means of an orthogonal demodulator 415, to thereby extract Doppler signals; that is, signal I and signal Q which shift in proportion to the speed of the vehicle 401. The Doppler signals are sent to a Doppler signal processing section 416.

The Doppler signal processing section 416 detects the traveling direction of the vehicle 401 which causes the reflected wave Wf. Sine the Doppler signals; that is, signals I and Q, advance or lag depending on the traveling direction of the vehicle 401. Therefore, the traveling direction of the vehicle 401 can be detected on the basis of the phase relationship between I and Q signals.

The thus-detected traveling direction is output to a control section 417. The control section 417 inhibits establishment of radio communication with a vehicle in the opposite lane, the vehicle traveling away from the road antenna 404 (i.e., a signal relating to the traveling direction of the vehicle shows that the vehicle moves away).

Embodiment 9

Figure 19:
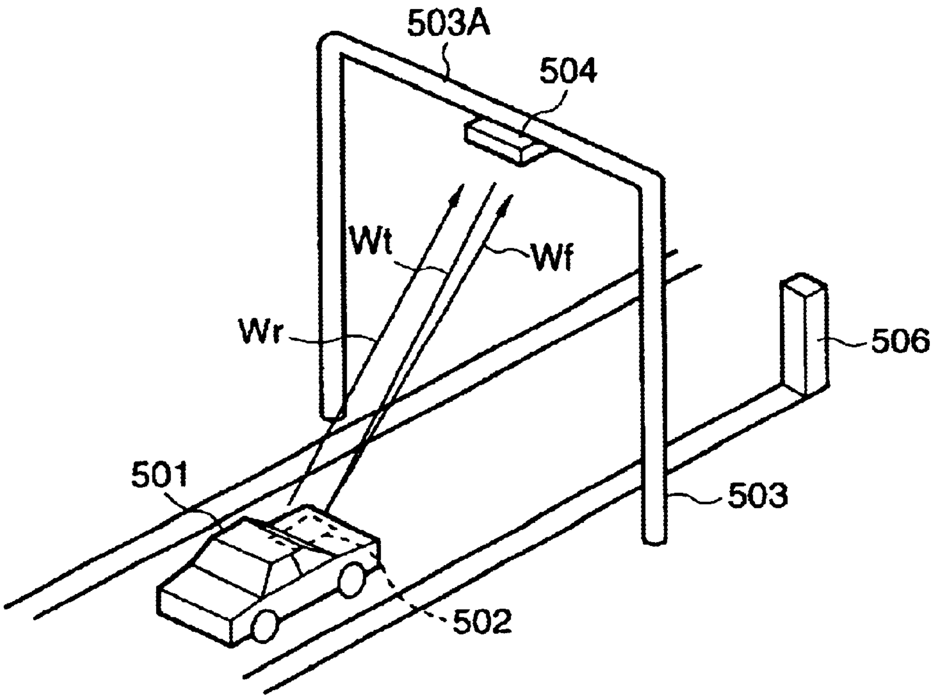
FIG. 19 is a perspective general view showing the configuration of a travel-speed support system according to ninth embodiment.

A ninth embodiment of the present invention will now be described by reference to FIGS. 19 and 20. FIG. 19 is an outline showing the structure of the present invention. As shown in FIG. 19, an antenna 504 is mounted at a center plate 503A of a post 503, and on-vehicle radio device 502 is mounted in a traveling vehicle 501.

The antenna 504 transmits a transmission wave Wt to the on-vehicle radio device 502 of the traveling vehicle 501 and receives a receipt wave Wr transmitted from the on-vehicle radio device 502, thus establishing radio communication with the on-vehicle radio device 502. Simultaneously, the antenna 504 receives a reflected wave Wf which arises when the transmission wave wt is reflected by the traveling vehicle 501.

In the present embodiment, as an undulation source (i.e., the traveling vehicle 501) approaches an observer (i.e., the antenna 504), the frequency of the reflected wave Wf becomes greater than that of the transmission wave Wt. In contrast, as the undulation source departs from the observer, the frequency of the reflected wave Wf becomes lower than that of the transmission wave Wt. The travel speed of the traveling vehicle 501 can be processed through such use of the Doppler effect.

Information about the travel speed of the traveling vehicle 501 is transmitted to a speed warning machine 506 installed on a road, or to the on-vehicle radio device 502 mounted on the traveling vehicle 501, to thereby send a warning to only a vehicle which is traveling at high speed.

Figure 20:
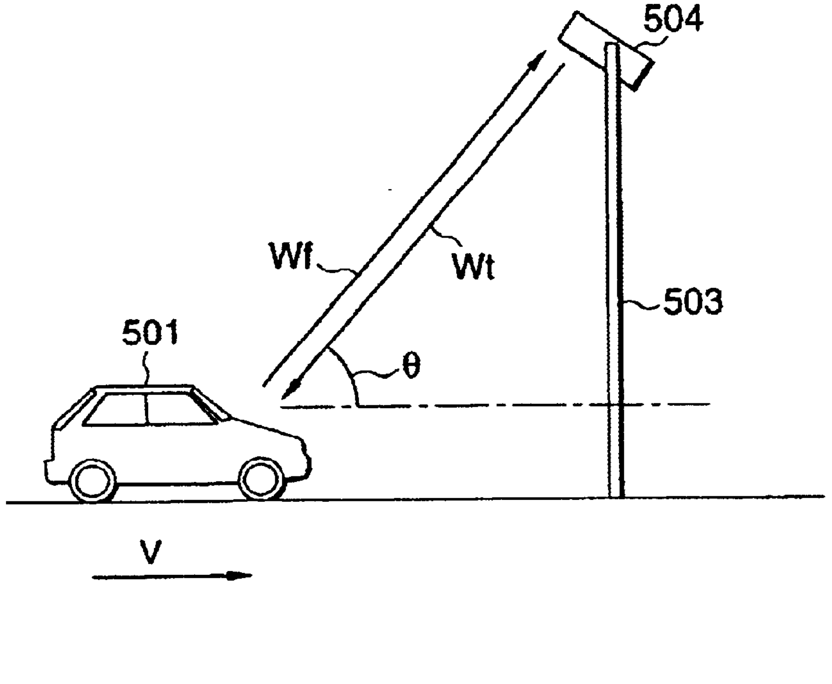
FIG. 20 is an illustration showing a relationship between a Doppler signal and the speed of a vehicle according to ninth embodiment.

FIG. 20 shows the principle on which the speed of a traveling vehicle is measured through use of the Doppler effect. An antenna 504 mounted on a post 503 receives a reflected wave Wf which is produced when a transmission wave Wt output from the antenna 504 is reflected by the traveling vehicle 501.

For instance, provided that an angle θ at which the transmission wave Wt enters the traveling vehicle 501 is taken, a travel speed V of the traveling vehicle 21 is usually expressed by the following equation.

$$V=2c\cdot fd/ft\cdot\cos\theta$$

where c represents the speed of light, ft represents a transmission frequency, and fd is a Doppler frequency.

Provided that θ=0 (deg.) and “ft” is 5.8 GHz, the travel speed of the vehicle is processed on the basis of the fact that a travel speed of 1 km/h equivalents to a Doppler frequency of 10.75 Hz.

Figure 21:
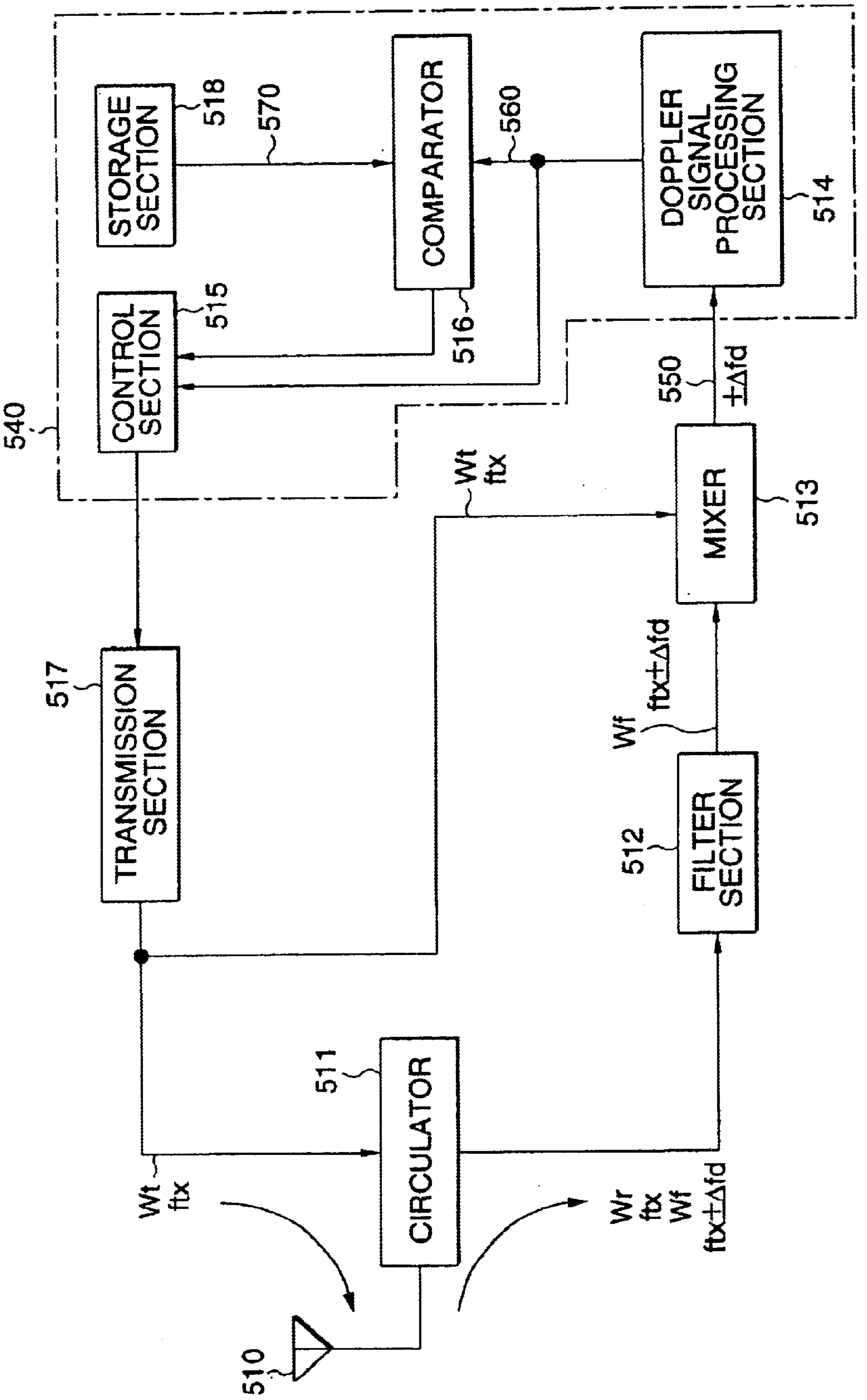
FIG. 21 is a block diagram showing an antenna system according to ninth embodiment.

FIG. 21 is a block diagram showing an antenna according to this embodiment. The transmission wave Wt output from a transmission section 517 is delivered to solely an antenna section 510 by means of a circulator 511 shown in FIG. 21.

A transmission wave Wt is delivered to the antenna section 510. After the transmission wave Wt has been received by the on-vehicle radio device 502 mounted in the traveling vehicle 501, the transmission wave Wt output from the on-vehicle radio device 502 and a reflected wave Wf—which is reflected by the traveling vehicle 501 and is shifted in proportion to the travel speed of the traveling vehicle—are received by the antenna section 510 and delivered to a filter section 512 by means of the circulator 511.

The filter section 512 eliminates a received wave Wr and permits passage of only a reflected wave Wf. A mixer 513 mixes the reflected wave Wf with the transmission wave Wt, to thereby extract only a Doppler signal 550 which is shifted in proportion to the travel speed of the vehicle. The Doppler signal 550 is delivered to a Doppler signal processing section 514. Determination means 520 is essentially made up of the Doppler signal processing section 514, a control section 515, and a comparator 516.

The Doppler signal processing section 514 processes the travel speed of the vehicle which has produced the reflected wave Wf. Since the Doppler signal 550 is shifted in proportion to the speed of the vehicle 501, the speed of the vehicle 501 can be determined by means of measuring the frequency of the Doppler signal 550. The thus-determined speed is output as speed information 560 to the control section 515.

The speed information 560 and a warning speed 570 previously set to a storage section 518 are input to the comparator 516, where the speed information 560 is compared with the warning speed 570. The result of comparison is output to the control section 515. The control section 515 issues a warning message to the vehicle 501 from the speed warning machine 506 in a case where the result output from the comparator 516 is positive.

More specifically, a warning signal is sent to the transmission section 517 of the on-vehicle radio device 502 mounted in the vehicle 501, wherewith the on-vehicle radio device 502 issues a warning message, to thereby urge a driver to reduce the travel speed.

Embodiment 10

Figure 22:
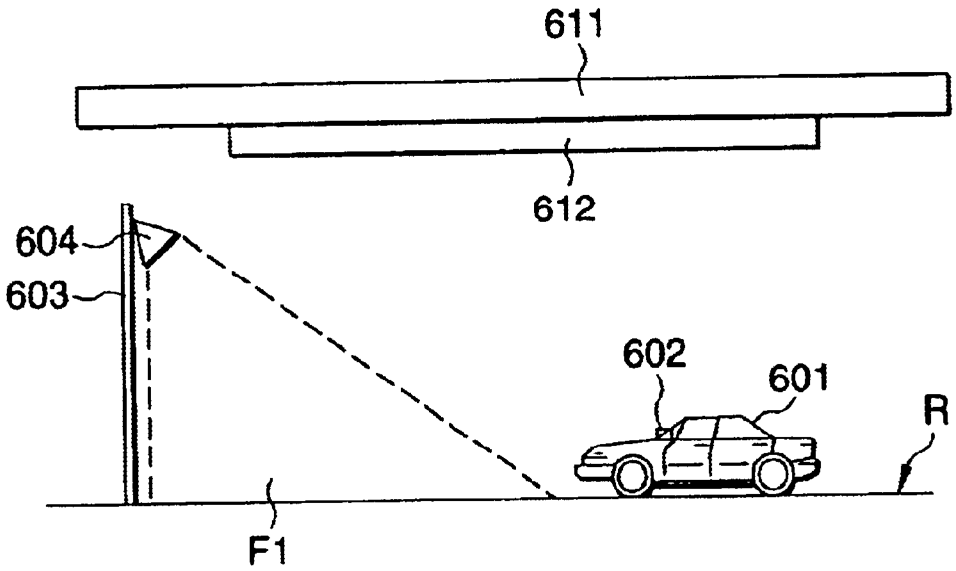
FIG. 22 is an illustration showing a road antenna according to tenth embodiment of the present invention.

FIG. 22 is an illustration showing a road antenna according to the tenth embodiment of the present invention. As shown in FIG. 22, a vehicle 601 is equipped with an on-vehicle device 602, and a road antenna 604 is mounted on a post 603 and at an elevated position above a road R. Radio communication is established between the on-vehicle device 602 and the road antenna 604. A sheet-like thin radio-wave absorbing member 612 is laid on the underside of a roof 611 disposed at an elevated position above the road antenna 604.

Figure 23:
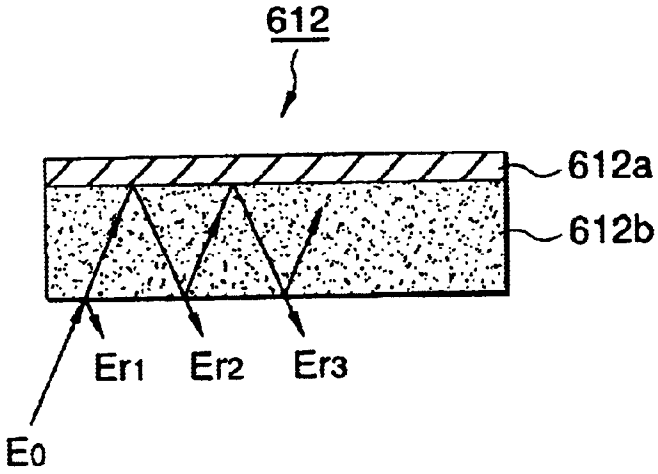
FIG. 23 is a cross-sectional view for describing the principle on which a single layer radio-wave absorbing member absorbs a radio wave.

FIG. 23 is a cross-sectional view for describing the principle on which a single layer radio-wave absorbing member constituting the thin radio-wave absorbing member 612 absorbs a radio wave.

As shown in FIG. 23, the thin radio-absorbing member 612 is formed by stacking a metal plate 612*a* on absorbing material 612*b*. When a radio wave of field Eo enters the absorbing material 612*b*, field Er1 is reflected by the absorbing material 612*b*, and a remaining portion of the radio wave passes through the inside of the absorbing material 612*b*. The absorbing material 612*b* may be formed of resistive fiber, FRP, rubber ferrite, or rubber carbon.

The radio wave which has entered the inside of the absorbing material 612*b* is attenuated in the form of an exponential function, by virtue of the attenuation factor of the absorbing material 612*b*. However, the radio wave is not sufficiently reduced, and hence the radio wave is totally reflected by the metal plate 612*a*. The radio wave that has been totally reflected reaches the surface of the absorbing material 612*b* while being attenuated by the absorbing material 612*b*. A portion of the thus-attenuated radio wave is reflected by a boundary surface between the surface of the absorbing material 612*b* and the inside thereof, and the thus-reflected portion enters the inside of the absorbing material 612*b*. The remaining portion of the radio wave goes out the absorbing material 612*b*, thus generating field Er2 which corresponds to the radio wave reflected by the absorbing material 612*b*.

The radio wave is repeatedly subjected to the foregoing steps, thereby causing reflected radio waves to propagate toward the road. Every time the radio wave travels through the inside of the absorbing material 612*b*, the intensity of electric field of the radio wave is gradually reduced as the radio wave is reflected by the thin radio-absorbing member 612.

If the first reflected field Er1 and the second reflected field Er2 are caused to become equal in intensity and opposite in phase, the reflection factor of the absorbing material 612*b* becomes zero. However, a single reflection of a radio wave off the metal plate 612*a* is insufficient in practice, and consideration must be given to multiple reflections of a radio wave of the metal plate 612*a*. As mentioned above, the radio-wave absorbing material 612*b* has the function of attenuating an electric field and delaying the phase of the electric field.

The operation of the road antenna according to the tenth embodiment will now be described. The road antenna 604 is disposed at a certain elevated position above the road R and at a certain angle. The road antenna 604 is formed by means of a beam-shaping operation, has a directional pattern, and radiates a radio wave at a specified transmission E.I.R.P level.

The radio wave emitted from the road antenna 604 forms the communications area F1 and is reflected by the road R. The radio wave reflected by the road R reaches the roof 611. The thin radio-wave absorbing member 612 laid on the roof 611 absorbs the reflected radio wave, thus preventing reflection of the radio wave, which would otherwise be caused by the roof 611.

According to this embodiment, the thin radio-wave absorbing material 612 is laid on a structure disposed at an elevated position above the road antenna 604. As a result, there is formed a narrow communications area, which would also be formed when no structure is present above the road antenna 604.

Embodiment 11

Figure 24:
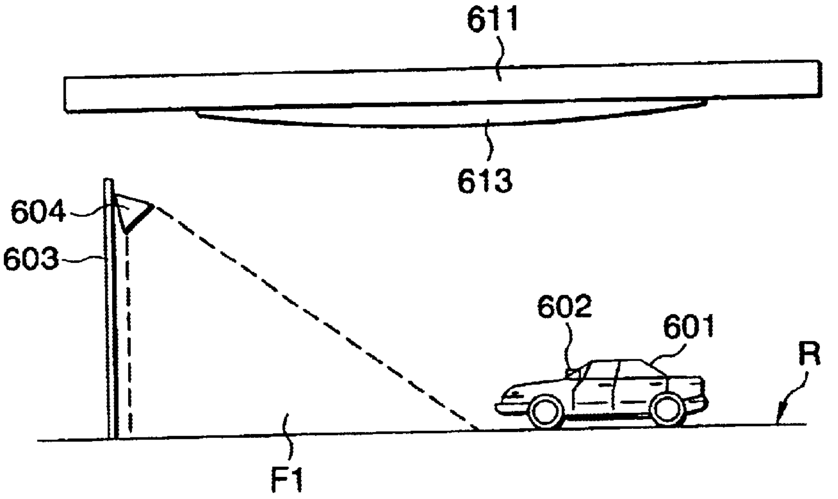
FIG. 24 is an illustration showing a road antenna according to eleventh embodiment.

FIG. 24 is an illustration showing a road antenna according to the eleventh embodiment of the present invention. As illustrated, the vehicle 601 is equipped with the on-vehicle device 602, and the road antenna 604 is mounted on the post 603 and at an elevated position above the road R. Radio communication is established between the on-vehicle device 602 and the road antenna 604. A paint-type radio-wave absorbing member 613 is laid on the underside of the roof 611 disposed at an elevated position above the road antenna 604. The paint-type radio-wave absorbing member 613 is identical in absorption principle and material with the thin radio-absorbing member 612.

The road antenna 604 is disposed at a certain elevated position above the road R and at a certain angle. The road antenna 604 is formed by means of a beam-shaping operation, has a directional pattern, and radiates a radio wave at a specified transmission E.I.R.P level.

The radio wave emitted from the road antenna 604 forms the communications area F1 and is reflected by the road R. The radio wave reflected by the road R reaches the roof 611. The thin radio-wave absorbing member 613 laid on the roof 611 absorbs the reflected radio wave, thus preventing reflection of a radio wave, which would otherwise be caused by the roof 611.

According to the present embodiment, the paint-type radio-wave absorbing material 613 is laid on a structure disposed at an elevated position above the road antenna 604. As a result, there is formed a narrow communications area, which would also be formed when no structure is present above the road antenna 604.

Embodiment 12

Figure 25:
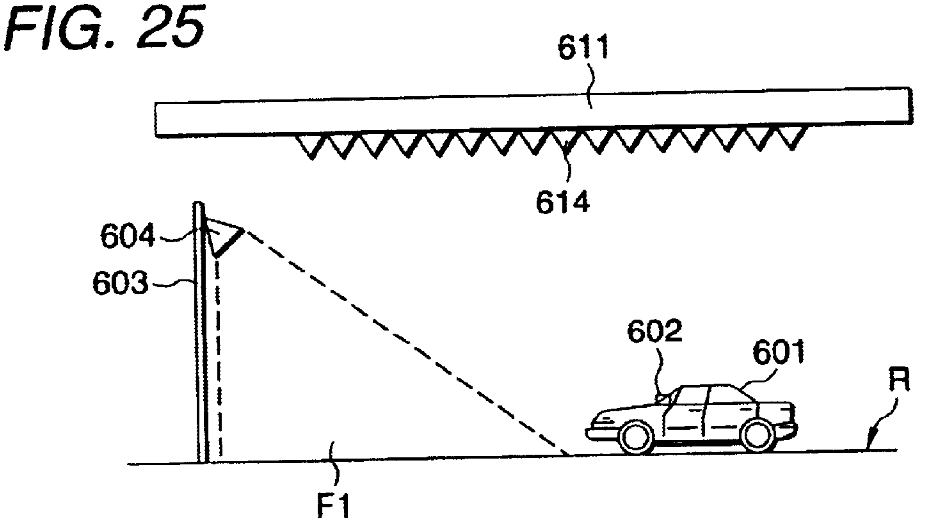
FIG. 25 is an illustration showing a road antenna according to a twelfth embodiment of the present invention.

FIG. 25 is an illustration showing a road antenna according to the twelveth embodiment of the present invention. As illustrated, the vehicle 1 is equipped with the on-vehicle device 602, and the road antenna 604 is mounted on the post 603 and at an elevated position above the road R. Radio communication is established between the on-vehicle device 602 and the road antenna 604. A wedged multilayer radio-wave absorbing member 614 is laid on the underside of the roof 611 disposed at an elevated position above the road antenna 604.

Figure 26:
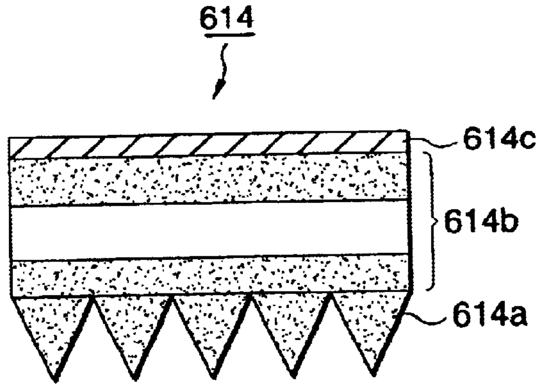
FIG. 26 is an enlarged view showing a multilayer radio-wave absorbing member.
Figure 27:
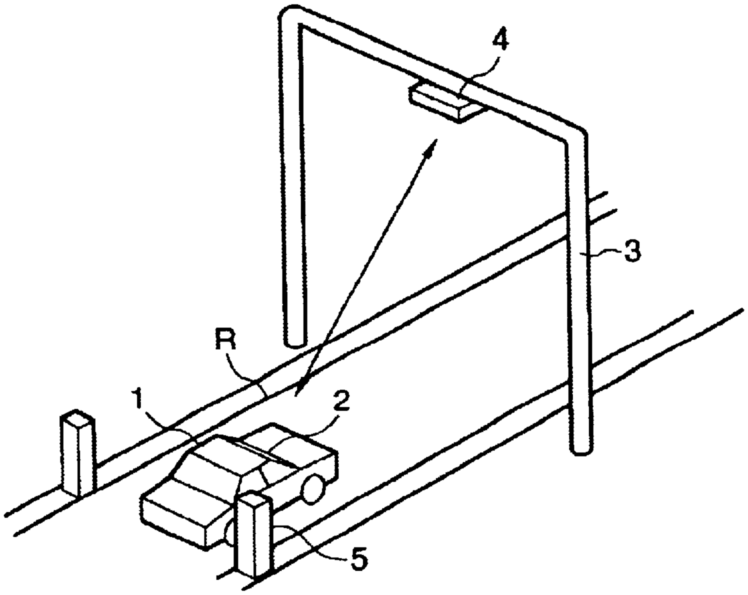
FIG. 27 shows an example of electric toll collection system.
Figure 28:
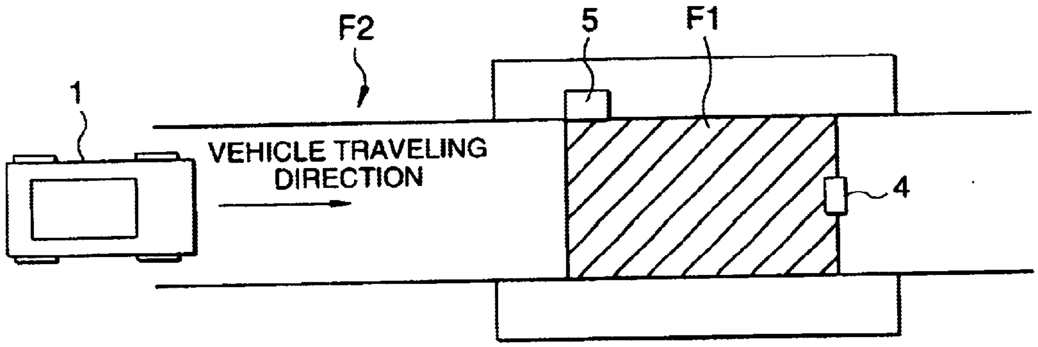
FIG. 28 shows an example of communications area.
Figure 29:
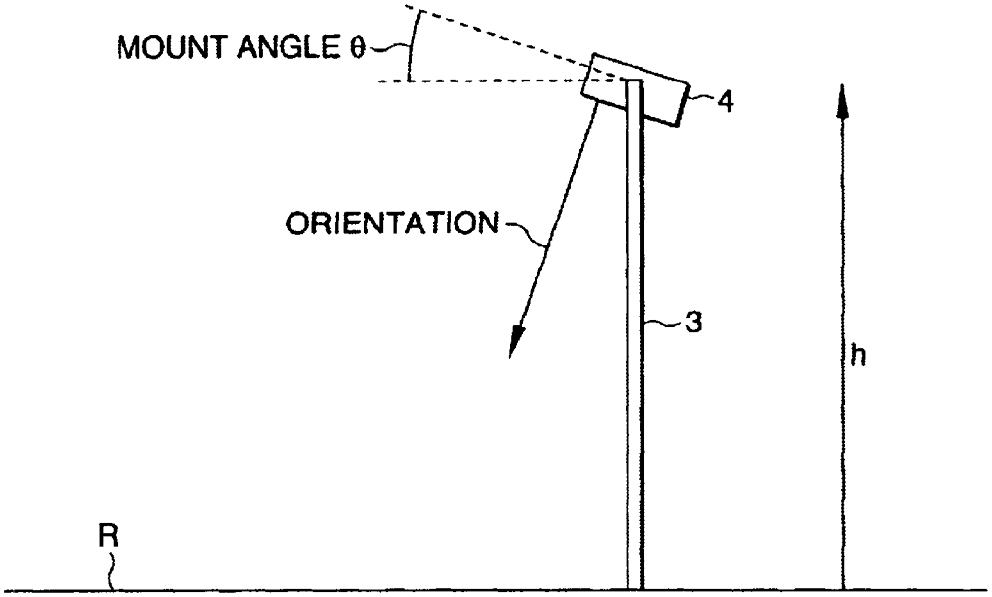
FIG. 29 is an illustration showing an example in which a road antenna is mounted.
Figure 30:
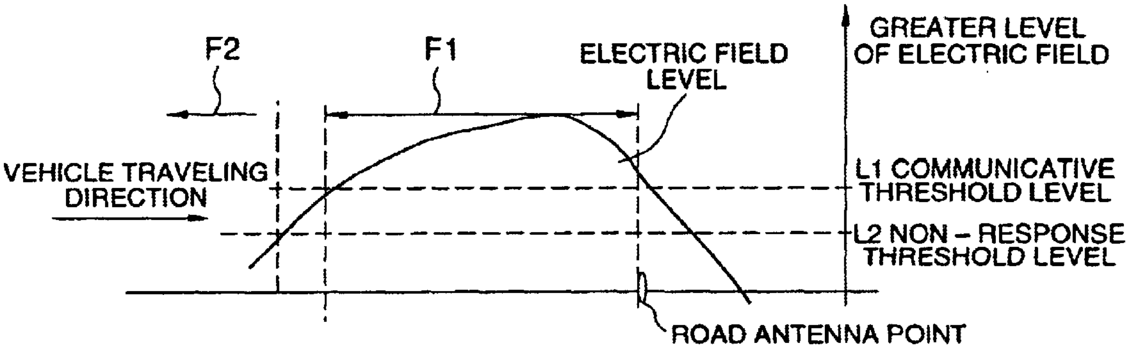
FIG. 30 shows an example distribution of level of receiving electric field in a direction in which a vehicle is traveling.
Figure 31:
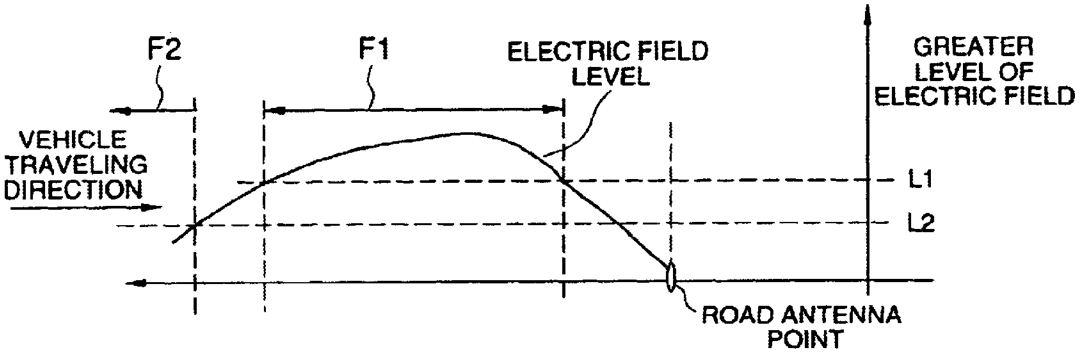
FIG. 31 shows an example distribution of level of receiving electric field in a direction in which a vehicle is traveling, when the angle at which the road antenna is mounted is changed.
Figure 32:
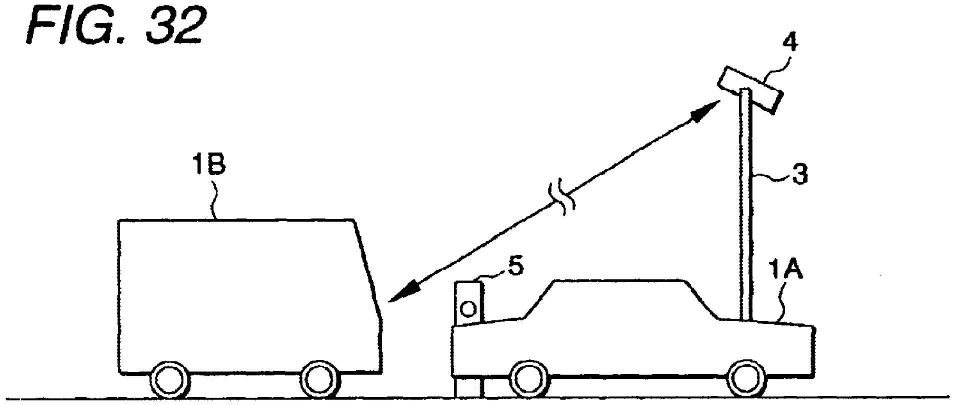
FIG. 32 an explanatory view showing an example operation failure of the electric toll collection system.
Figure 33:
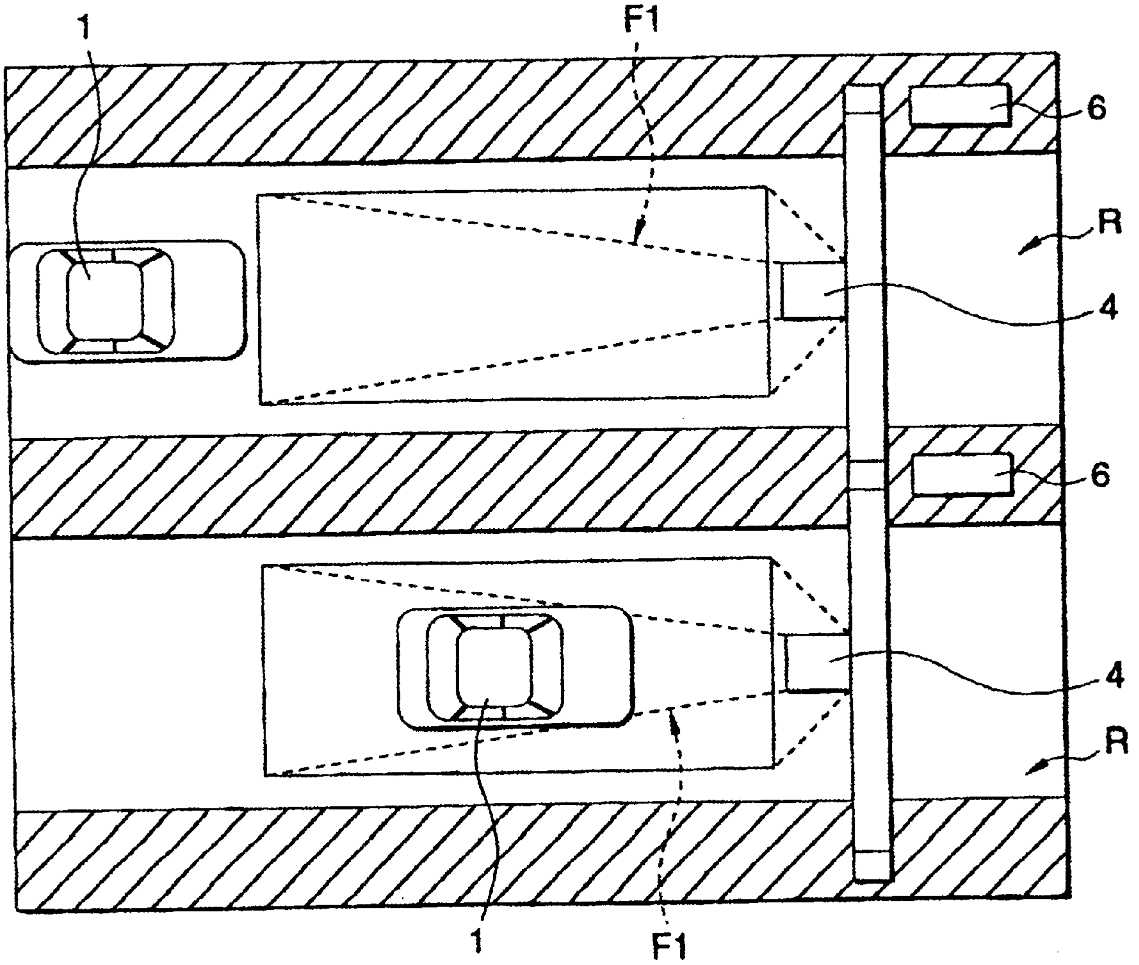
FIG. 33 shows an example of communications area.
Figure 34:
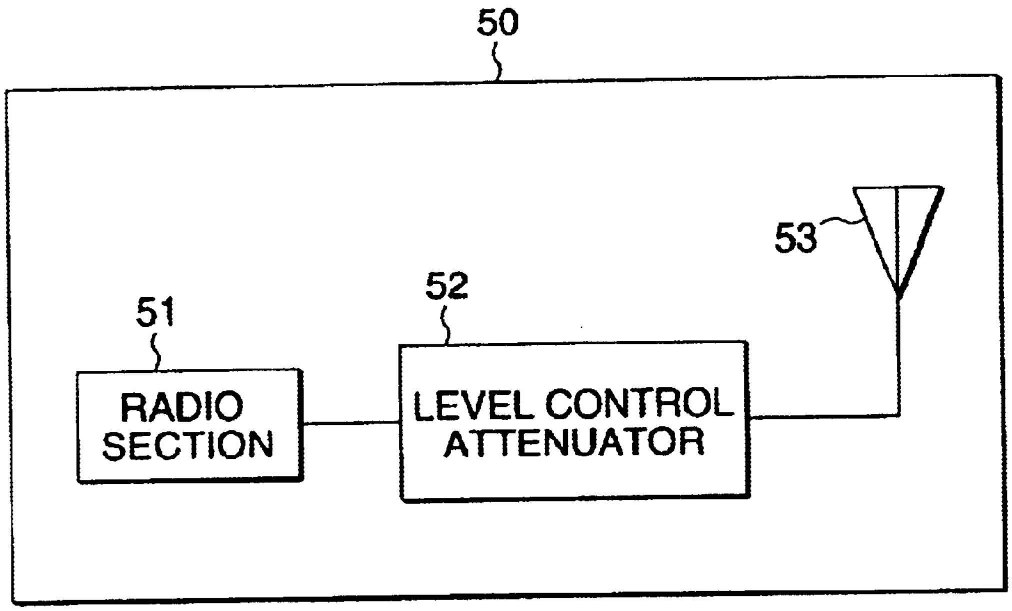
FIG. 34 is a block diagram showing the configuration of a commonly-used transmission circuit.
Figure 35:
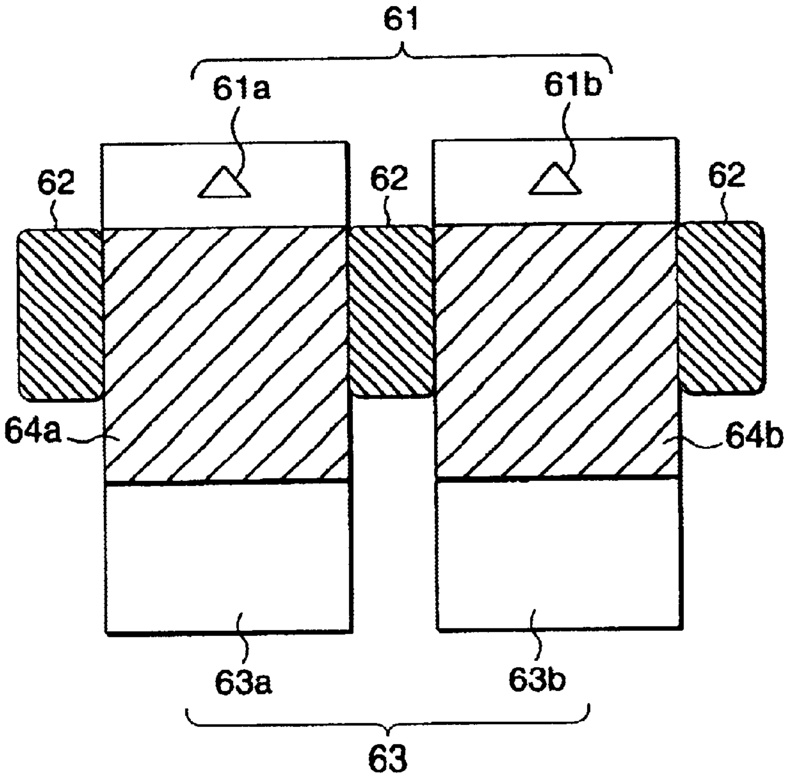
FIG. 35 is a diagram showing an example tollgate antenna employed in a turnpike ETC system.

FIG. 26 is an enlarged cross-section of the wedged multilayer radio-wave absorbing member 614. The wedged multilayer radio-wave absorbing member 614 is formed by stacking, in the sequence given, a wedge 14*a* formed of an absorbing material, an intermediate multilayer absorbing material 614*b*, and a metal plate 614*c*.

In terms of a frequency band or entrance characteristic, a single layer radio-wave absorbing member encounters a limitation. For this reason, there is employed a multilayer structure, in which a material having a material constant close to that of air is provided at a position close to the surface of an absorbing member, and a material having a greater radio-wave absorbing characteristic is provided in a deeper position of the absorbing member. Accordingly, there is achieved a broad radio-wave absorbing characteristic, in which, even if the frequency of a reflected radio wave is changed slightly, the radio wave enters the inside of the absorbing member and is gradually attenuated. Further, the absorbing member is formed into a wedge or pyramid geometry, thereby decreasing the surface area of the absorbing member. Even when an absorbing member is formed from a single material, the dielectric constant of the absorbing member is equivalently reduced, thus achieving a dielectric constant close to that of air.

The operation of the road antenna according to the third embodiment will now be described. The road antenna 604 is formed by means of a beam-shaping operation, has a directional pattern, and is disposed at a certain elevated position above the road R and at a certain angle. The road antenna 604 radiates a radio wave at a specified transmission E.I.R.P level.

The radio wave emitted from the road antenna 604 forms the communications area F1 and is reflected by the road R. The radio wave reflected by the road R reaches the roof 611. The wedged multilayer radio-wave absorbing member 614 laid on the roof 611 absorbs the reflected radio wave, thus preventing reflection of a radio wave, which would otherwise be caused by the roof 611.

According to this embodiment, the wedged multilayer radio-wave absorbing material 614 is laid on a structure disposed at an elevated position above the road antenna 604. As a result, there is formed a narrow communications area, which would also be formed when no structure is present above the road antenna 604.

As has been described, according to the present invention, an offset in mount angle of a road antenna can be readily ascertained on a road, on the basis of a target position onto which a laser beam is to be radiated and a position on which a laser beam is actually radiated. So long as an angle of the road antenna is adjusted once per day, the road antenna yields an advantage of maintaining the ability to correctly collect a toll.

According to the present invention, a receiver detects the transmission power of a radio wave output from a road antenna, and the road antenna is subjected to feedback control on the basis of the thus-detected signal, thereby maintaining constant the power of a radio wave output from the road antenna. Consequently, the present invention suppresses occurrence of a change in a communications area, thereby preventing interference of radio communication established by a vehicle traveling in an adjacent lane and occurrence of a system failure.

Further, the communications area setting method according to the present invention enables setting of a desired communications area on the basis of receiving rates, the receiving rates having been detected by the receiving rate determination means of the receiver when a transmission output of the transmitter is changed. Setting of a communications area does not involve a necessity for measuring a field intensity and can be performed readily.

The radio system according to the present invention is configured so as to modulate/demodulate a transmission signal, to thereby detect a receiving rate which has been determined on a per-frame basis when the receiving section demodulates digital data. As a result, a desired communications area can be set by means of changing only a transmission output of the transmission section on the basis of the receiving rate of each frame.

The transmitter according to the present invention modulates a transmission signal and can vary a communications area by means of a transmission output being variably controlled by the gain controller. Thus, a desired communications area can be set by means of varying a transmission output.

A communications area can be changed by means of varying a amplification gain of the voltage-controlled amplifier, the amount of attenuation of the voltage-controlled attenuator, the angle at which the antenna is mounted, or a combination thereof.

The receiver according to the present invention detects a receiving rate on a per-frame basis at the time of demodulation of a modulated transmission signal and changes a transmission output of the transmitter, thereby setting a desired communications area on the basis of a change in receiving rate.

Moreover, a transmission wave transmitted from a road antenna is reflected by a traveling vehicle, thus causing a reflected wave. From the reflected wave, Doppler signals which shift in proportion to the relative speed of the traveling vehicle are detected. on the basis of the Doppler signals, the traveling direction of the traveling vehicle is detected, thereby avoiding establishment of erroneous communication with an oncoming vehicle traveling in the opposite lane.

Further, a transmission wave sent from an antenna section is reflected by a vehicle, to thereby produce a reflected wave. A Doppler signal which is shifted in proportion to a relative speed of the vehicle is detected by receipt of the reflected wave and determine the travel speed of a traveling vehicle. Thus, the present invention can reduce the speed of a traveling vehicle.

A warning to reduce a travel speed can be sent to a driver of a vehicle which is traveling in excess of a speed limit. Accordingly, the present invention can assist in realization of safe travel on a road interconnecting a turnpike and an ordinary road.

Furthermore, according to the present invention, even when a roof-like structure is located at an elevated position above a road antenna, a radio-absorbing member is provided on the structure, to thereby realize a narrow communications area, which would also be formed when no such structure is present.

What is claimed is:

1. A travel-speed support system comprising:

an on-vehicle radio device mounted in a vehicle;

an antenna mounted above a road and establishing radio communication with the on-vehicle radio-device via a radio wave emitted from the antenna; and determining means provided in the antenna and determining whether the travel speed of the vehicle is appropriate for a speed limit imposed on a road, on the basis of the travel speed of the vehicle based on a signal corresponding to a reflected wave, the reflected wave being produced as a result of said radio wave emitted from the antenna being reflected by the vehicle.

2. The travel-speed support system as described in claim 1, wherein the antenna includes:

a receiver which receives the reflected wave; and a detector which detects a signal received by the receiver and the speed of the vehicle.

3. The travel-speed support system as described in claim 1, wherein the antenna includes:

speed warning means which compares the travel speed of the vehicle detected by the detector with a predetermined warning speed, determines whether the speed of the vehicle exceeds the warning speed, and issues a warning to the vehicle if the vehicle exceeds the warning speed.

4. An antenna for use with a travel-speed support system, comprising:

on-vehicle radio device mounted in a traveling vehicle;

an antenna disposed at a position above a road, and establishing radio communication with the on-vehicle radio device via a radio wave emitted from the antenna; and a speed detector which measures the speed of the traveling vehicle on the basis of a signal corresponding to a reflected wave by means of the Doppler effect when the vehicle approaches or departs from the antenna, the reflected wave being produced when said radio wave is reflected by the vehicle, wherein the road includes both a turnpike and an ordinary road.

5. The antenna as described in claim 4, wherein the antenna includes:

a receiver which receives the reflected; and a detector which detects a signal received by the receiver and the speed of the vehicle.

6. The antenna as described in claim 4, wherein the antenna includes:

a speed detector which compares the travel speed of the vehicle as detected by the detection means with a predetermined warning speed, determines whether or not the speed of the vehicle exceeds the warning speed, and issues a warning to the vehicle if the vehicle exceeds the warning speed.

* * * * *

UNITED STATES PATENT AND TRADEMARK OFFICE

CERTIFICATE OF CORRECTION

PATENT NO. : 6,646,590 B2
DATED : November 11, 2003
INVENTOR(S) : Masaki Terashima et al.

It is certified that error appears in the above-identified patent and that said Letters Patent is hereby corrected as shown below:

Column 17,
Line 27, please delete "wave wt", and insert therefor -- wave Wt --.

Column 21,
Line 53, please delete "on the basis of", and insert therefor -- On the basis of --.

Signed and Sealed this

Twenty-fourth Day of February, 2004

JON W. DUDAS
*Acting Director of the United States Patent and Trademark Office*